(12) United States Patent
Ohbitsu

(10) Patent No.: US 9,116,359 B2
(45) Date of Patent: Aug. 25, 2015

(54) STEREOSCOPIC IMAGE DISPLAY APPARATUS

(71) Applicant: FUJITSU LIMITED, Kawasaki-shi, Kanagawa (JP)

(72) Inventor: Toshiro Ohbitsu, Akishima (JP)

(73) Assignee: FUJITSU LIMITED, Kawasaki (JP)

( * ) Notice: Subject to any disclaimer, the term of this patent is extended or adjusted under 35 U.S.C. 154(b) by 16 days.

(21) Appl. No.: 14/173,043

(22) Filed: Feb. 5, 2014

(65) Prior Publication Data

US 2014/0152556 A1 Jun. 5, 2014

Related U.S. Application Data

(63) Continuation of application No. PCT/JP2011/068391, filed on Aug. 11, 2011.

(51) Int. Cl.
  *G06F 3/01* (2006.01)
  *G02B 27/22* (2006.01)
  *H04N 13/04* (2006.01)
  *G02B 27/00* (2006.01)

(52) U.S. Cl.
  CPC ........ *G02B 27/2214* (2013.01); *G02B 27/0093* (2013.01); *G06F 3/013* (2013.01); *H04N 13/0404* (2013.01); *H04N 13/0415* (2013.01); *H04N 13/0472* (2013.01); *H04N 13/0422* (2013.01); *H04N 13/0475* (2013.01); *H04N 13/0484* (2013.01)

(58) Field of Classification Search
  CPC combination set(s) only.
  See application file for complete search history.

(56) References Cited

U.S. PATENT DOCUMENTS

| 5,083,199 | A | 1/1992 | Boerner |
| 6,608,622 | B1 | 8/2003 | Katayama et al. |
| 8,558,877 | B2 * | 10/2013 | Irie et al. .......................... 348/54 |
| 2002/0085287 | A1 | 7/2002 | Egawa |

FOREIGN PATENT DOCUMENTS

| JP | 03-038633 | 2/1991 |
| JP | 04-035192 | 2/1992 |

(Continued)

OTHER PUBLICATIONS

Sho Sakamoto et al., "Three-Dimensional Display using Curved Screen", Institute of Symbiotic Science and Technology, vol. 31, No. 31, Jun. 29, 2007, English translation of pp. 23-26.

(Continued)

*Primary Examiner* — Van Chow
(74) *Attorney, Agent, or Firm* — Fujitsu Patent Center

(57) ABSTRACT

To enable a viewer to recognize a stereoscopic image even when a posture of the viewer is changed in front of a display device by providing a stereoscopic image display apparatus including: a lens sheet which is adjacent to a display surface of a display device, and is configured by arranging a plurality of plano convex lenses along an arrangement direction of display elements, consecutively side by side while varying a distance from the display surface; a storage unit storing stereoscopic display images corresponding to parallax points with respect to a display object at a plurality of viewing points; a sensing unit which senses a posture changing amount of a visual organ of a human body; a selection unit selecting the stereoscopic display images for the respective viewing points according to the posture changing amount sensed; and a display controller allowing the stereoscopic display images on the display device.

4 Claims, 34 Drawing Sheets

(56) References Cited

FOREIGN PATENT DOCUMENTS

| | | |
|---|---|---|
| JP | 06-301033 | 10/1994 |
| JP | 08-116556 | 5/1996 |
| JP | 2000-098119 | 4/2000 |
| JP | 2002-107508 | 4/2002 |
| JP | 2002-366271 | 12/2002 |
| JP | 2003-131607 | 5/2003 |
| JP | 2004-279743 | 10/2004 |
| JP | 2005-176004 | 6/2005 |
| JP | 2007-041425 | 2/2007 |
| JP | 2008-066086 | 3/2008 |
| JP | 2008-170841 | 7/2008 |

OTHER PUBLICATIONS

Marc Chauvierre, "Matricial Scanning for Three-Dimensional Television", IEEE Transactions on Consumer Electronics, 1979, vol. CE-25, pp. 111-113.

Japan Electronics and Information Technology Industries Association, Catalog "Terminology on Display Device", First Edition Jul. 2006, English translation of pp. 45-2.17 Moire "Definition and Explanation".

International Search Report, mailed in connection with PCT/JP2011/068391 and mailed Sep. 6, 2011.

* cited by examiner

| L3Rk0 | L4Gk0 | L5Bk0 | L6Rk0 |
| --- | --- | --- | --- |
| L2Rk0 | L3Gk0 | L4Bk0 | L5Rk0 |
| L1Rk0 | L2Gk0 | L3Bk0 | L4Rk0 |

LEFT EYE

40R

| R3Rk0 | R4Gk0 | R5Bk0 | R6Rk0 |
| --- | --- | --- | --- |
| R2Rk0 | R3Gk0 | R4Bk0 | R5Rk0 |
| R1Rk0 | R2Gk0 | R3Bk0 | R4Rk0 |

RIGHT EYE

| L3Rl1 | L4Gl1 | L5Bl1 | L6Rl1 |
| --- | --- | --- | --- |
| L2Rl1 | L3Gl1 | L4Bl1 | L5Rl1 |
| L1Rl1 | L2Gl1 | L3Bl1 | L4Rl1 |

LEFT EYE

40R

| R3Rl1 | R4Gl1 | R5Bl1 | R6Rl1 |
| --- | --- | --- | --- |
| R2Rl1 | R3Gl1 | R4Bl1 | R5Rl1 |
| R1Rl1 | R2Gl1 | R3Bl1 | R4Rl1 |

RIGHT EYE

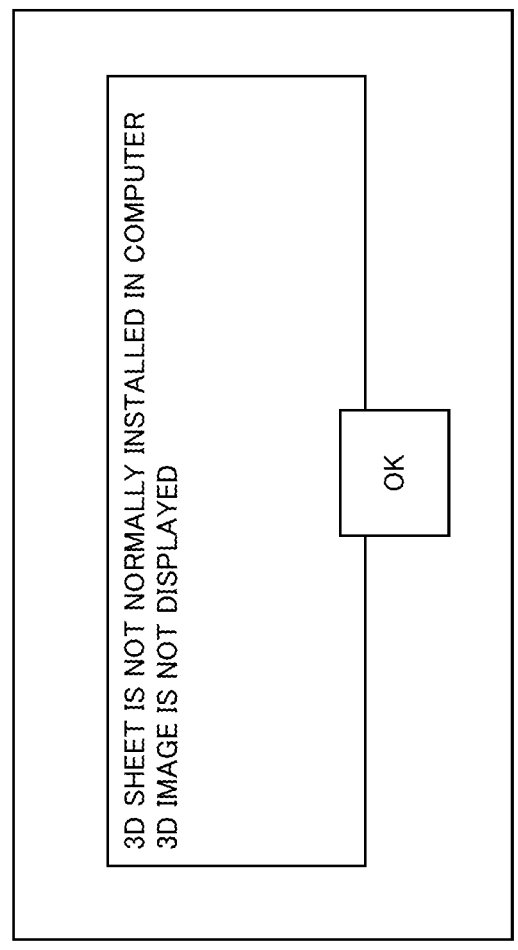

OBJECT CORRESPONDING TO
PARALLAX INFORMATION IN ROTATION
DIRECTION/STEREOSCOPIC IMAGE

OBJECT NOT BEING
STEREOSCOPIC IMAGE

IMAGE VIEWED BY VIEWER
AT NORMAL VIEWING POSITION

IMAGE VIEWED BY VIEWER
AT POSITION OTHER THAN
NORMAL VIEWING POSITION

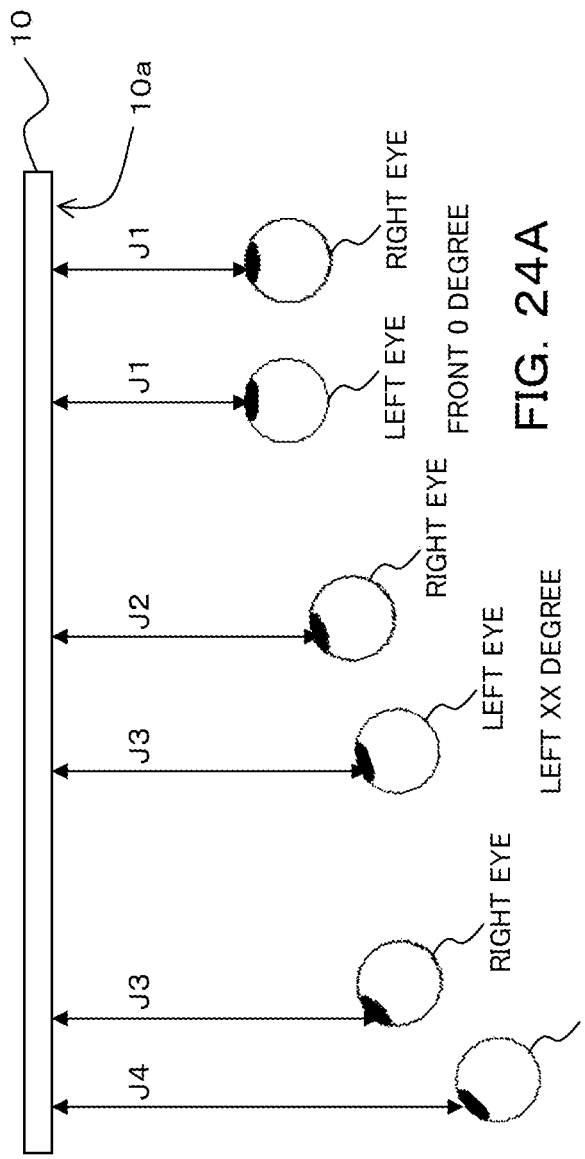

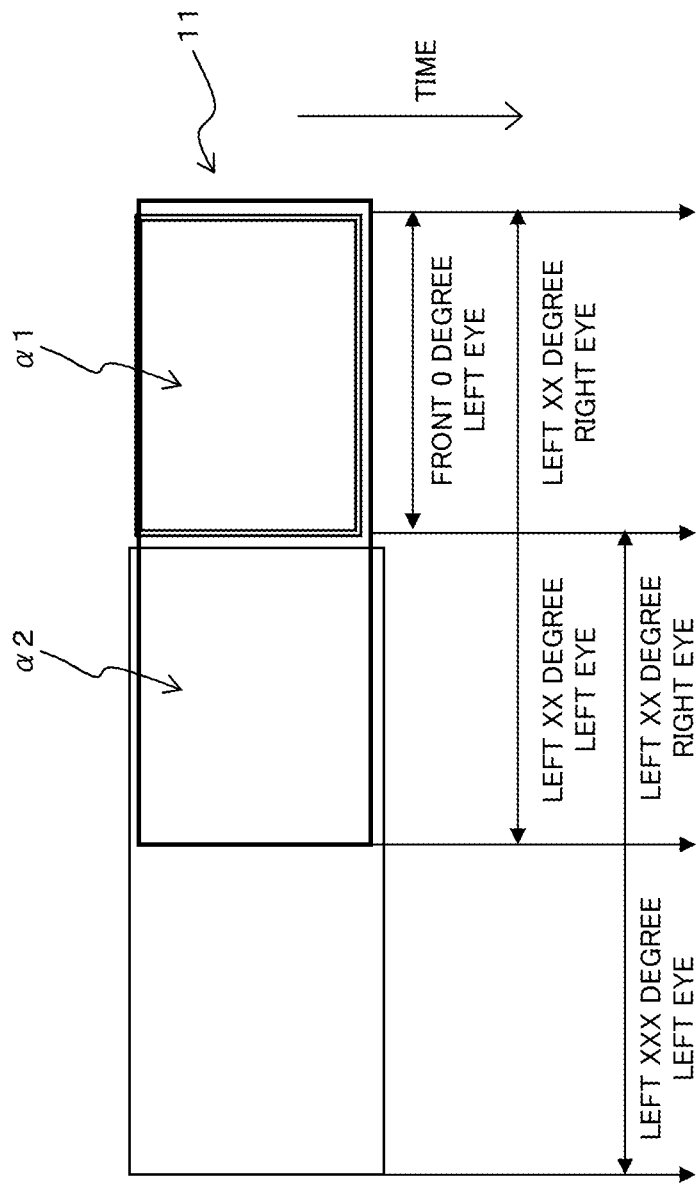

FIG. 29

| IMAGING DISTANCE | PIXEL-LENS DISTANCE |
|---|---|
| 1.00m | 4.025mm |
| 1.05m | 4.026mm |
| 1.10m | 4.027mm |
| 1.15m | 4.028mm |

FIG. 30

| ROTATED HEAD ANGLE (°) | PIXEL RANGE | PIXEL-LENS DISTANCE (mm) |
|---|---|---|
| 0 | 000-191 | 4.02500 |
| 20 | 192-383 | 4.02525 |
| 40 | 384-566 | 4.02550 |
| 60 | 567-767 | 4.02575 |
| 80 OR MORE | 768-960 | 4.02600 |

STEREOSCOPIC IMAGE DISPLAY APPARATUS

CROSS-REFERENCE TO RELATED APPLICATION

This application is a continuation application of International Application PCT/JP2011/068391, filed on Aug. 11, 2011 and designated the U.S., the entire contents of which are incorporated herein by reference.

FIELD

The embodiments discussed herein are directed to a stereoscopic image display apparatus.

BACKGROUND

There is a stereoscopic image generation apparatus which generates an image which can be stereoscopically viewed by using parallax of images captured by two adjacent cameras. The stereoscopic image generation apparatus, for example, generates and displays the image captured by the one camera among the images captured by the two adjacent cameras as a left-eye image and the image captured by the other camera as a right-eye image.

A difference in the positions of the left-eye image and the right-eye image of the same object is referred to as parallax. Since parallax amount of two objects exist in an image are different from each other, the one object seems to exist in front of or in back of the other object according to the parallax amount. The parallax amount is a magnitude of the parallax.

FIG. 32 is a diagram illustrating an example of a stereoscopic image. In FIG. 32, an image 910 is a left-eye image, and an image 920 is a right-eye image. Herein, in each of the images 910 and 920 as left-eye and right-eye images, an object A, an object B, and an object C exist. Due to the parallax of these objects between the images 910 and 920, with respect to a person viewing the stereoscopic image of FIG. 32, these objects seem to exist in the order of the object A, the object B, and the object C from the front side.

[Patent Literature 1] Japanese Laid-open Patent Publication No. 2005-176004
[Patent Literature 2] Japanese Laid-open Patent Publication No. 2008-66086
[Patent Literature 3] Japanese Laid-open Patent Publication No. 2007-041425
[Patent Literature 4] Japanese Laid-open Patent Publication No. 06-301033
[Patent Literature 5] Japanese Laid-open Patent Publication No. 2000-98119
[Patent Literature 6] Japanese Laid-open Patent Publication No. 04-035192
[Non-Patent Literature 1] Glossary of Display Apparatus, Japan Electronics and Information Technology Industries Association In addition, in a stereoscopic image generation apparatus where a lenticular lens sheet is installed on a display device such as a liquid crystal display, right and left eyes are allowed to recognize different images without dedicated glasses.

FIG. 33 is a schematic plan diagram illustrating a structure of a stereoscopic image generation apparatus using a lens sheet in the related art. In an example illustrated in FIG. 33, a user (viewer) 903 is positioned in front of a stereoscopic image generation apparatus 900 in the related art where a lens sheet 902 is installed on a liquid crystal display 901.

The distance A from the viewer 903 to the lens sheet 902 in the vicinity of a central portion 902a of the liquid crystal display 901 is different from the distance B from the viewer 903 in front of the apparatus to the lens sheet 902 in the vicinity of a peripheral portion 902b of the liquid crystal display 901.

At the position in front of the stereoscopic image generation apparatus 900 in the related art, an image in the vicinity of the central portion 902a of the liquid crystal display 901 can be recognized as a stereoscopic image. However, when the user 903 turns (rotates) the head around the top TP of the head in the left or right direction to view the vicinity of the peripheral portion 902b, since the distances to the lens sheet 902 (liquid crystal display 901) are different, the images are blurred, so that the images cannot be recognized as a stereoscopic image.

The imaging distance (focal length) of the lens sheet of the stereoscopic image display apparatus in the related art will be described with reference to FIG. 34. First, a focal length of a general convex lens satisfies the following Equation (1).

$$1/f = (n-1)(1/R1 - 1/R2) + (n-1) \times (n-1)/n \times t/R1R2 \quad (1)$$

where,
f: focal length
n: refractive index of lens
R1: ratio of curvature viewed from the pixel side
R2: ratio of curvature viewed from the viewer side
t: thickness of lens Herein, since the plano convex lens has a semicylindrical shape, R2 has an infinite value, and thus, "1/R2" becomes zero.

In addition, similarly, since R2 has an infinite value, "t/R1R2" also becomes zero. Therefore, the above Equation (1) is expressed as follows.

$$1/f = (n-1)(1/R1)$$

In addition, herein, n is a fixed value according to a material of the lens. Therefore, f is determined depending on R1.

Since the distance from the lens to the viewer is "a", the focal length, that is, the position where the R, G, and B pixels form an image is f=a.

Therefore, the position where the viewer can form a 3D image is f, and the value of f is determined based on R1. In addition, R1 depends on the distance b from the pixel to the lens.

However, in the stereoscopic image generation apparatus 900 in the related art illustrated in FIG. 33, the distance b between the liquid crystal display 901 and the lens sheet 902 is constant, and thus, in order to control the image forming position of the 3D image, a ratio of curvature of each lens of the lens sheet 902 needs to be appropriately changed.

However, a pixel pitch of a general liquid crystal display is about 0.418 mm, and thus, in order to produce a lens sheet having a lens array with this accuracy, the lens forming accuracy needs to be in the order of 10–8 mm.

Therefore, the method of producing the lens sheet 902 by finely changing the ratio of curvature of the lens is difficult and impractical in terms of the lens forming accuracy.

SUMMARY

According to an aspect of the present invention, there is provided a stereoscopic image display apparatus including: a display device having a display surface where plural types of display elements are repeatedly and consecutively arranged; a lens sheet which is adjacent to the display surface and is configured by arranging a plurality of plano convex lenses, each of which is configured to include a convex portion protruding from the one surface and a flat plane as the other surface, in an arrangement direction where the display elements are repeated and consecutively arranged, consecutively side by side while varying a distance from the display surface; a storage unit which stores stereoscopic display images corresponding to parallax points with respect to a display object at plural viewing points; a sensing unit which senses a posture changing amount of a visual organ of a person; a selection unit which selects the stereoscopic display images for the respective viewing points from the storage unit according to the posture changing amount sensed by the sensing unit; and a display controller which allows the stereoscopic display images selected by the selection unit to be displayed on the display device.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIGS. 9A and 9B are diagrams illustrating examples of stereoscopic display images in the stereoscopic image display apparatus according to the embodiment;

FIG. 18 is a diagram illustrating a dialog box in the stereoscopic image display apparatus according to the embodiment;

FIGS. 24A, 24B, and 24C are diagrams illustrating positions of two eyes and imaging distances changed according to movement of the head of a viewer;

FIG. 25 is a diagram illustrating a relation between angles of the right and left eyes and positions used for focusing by the two eyes in the lens sheet in the stereoscopic image display apparatus according to the embodiment;

FIG. 29 is a diagram illustrating an imaging distance;

FIG. 30 is a diagram illustrating a relation among a rotated head angle, a pixel range, and a pixel-lens distance in the stereoscopic image display apparatus according to the embodiment;

DESCRIPTION OF EMBODIMENT(S)

Hereinafter, embodiments of the present invention will be described with reference to the drawings.

Figure 1:
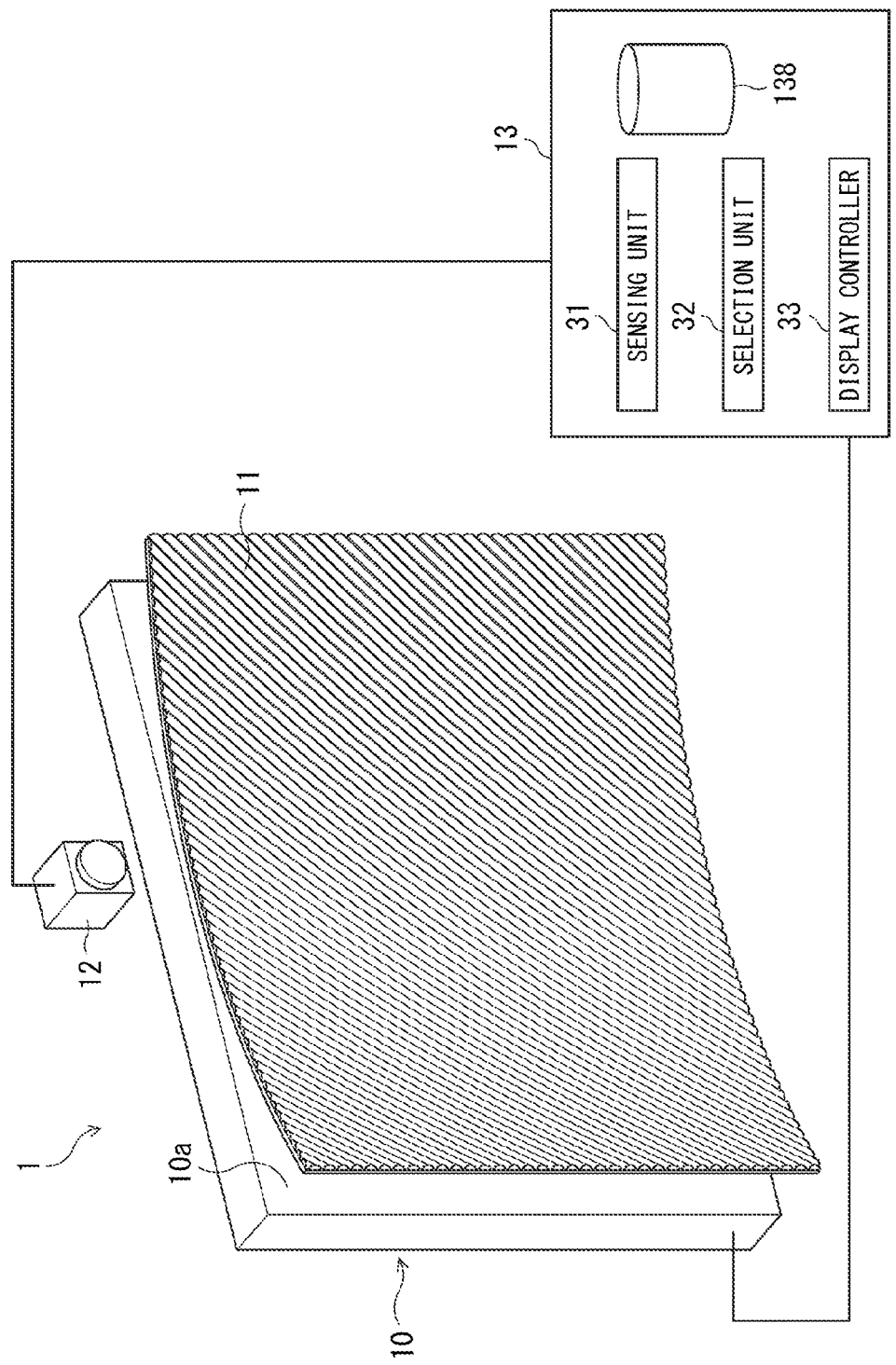
FIG. 1 is a schematic diagram illustrating a configuration of a stereoscopic image display apparatus according to an embodiment.
Figure 2:
FIG. 2 is a diagram illustrating an example of arrangement of display elements of a display device of the stereoscopic image display apparatus according to the embodiment.
Figure 3:
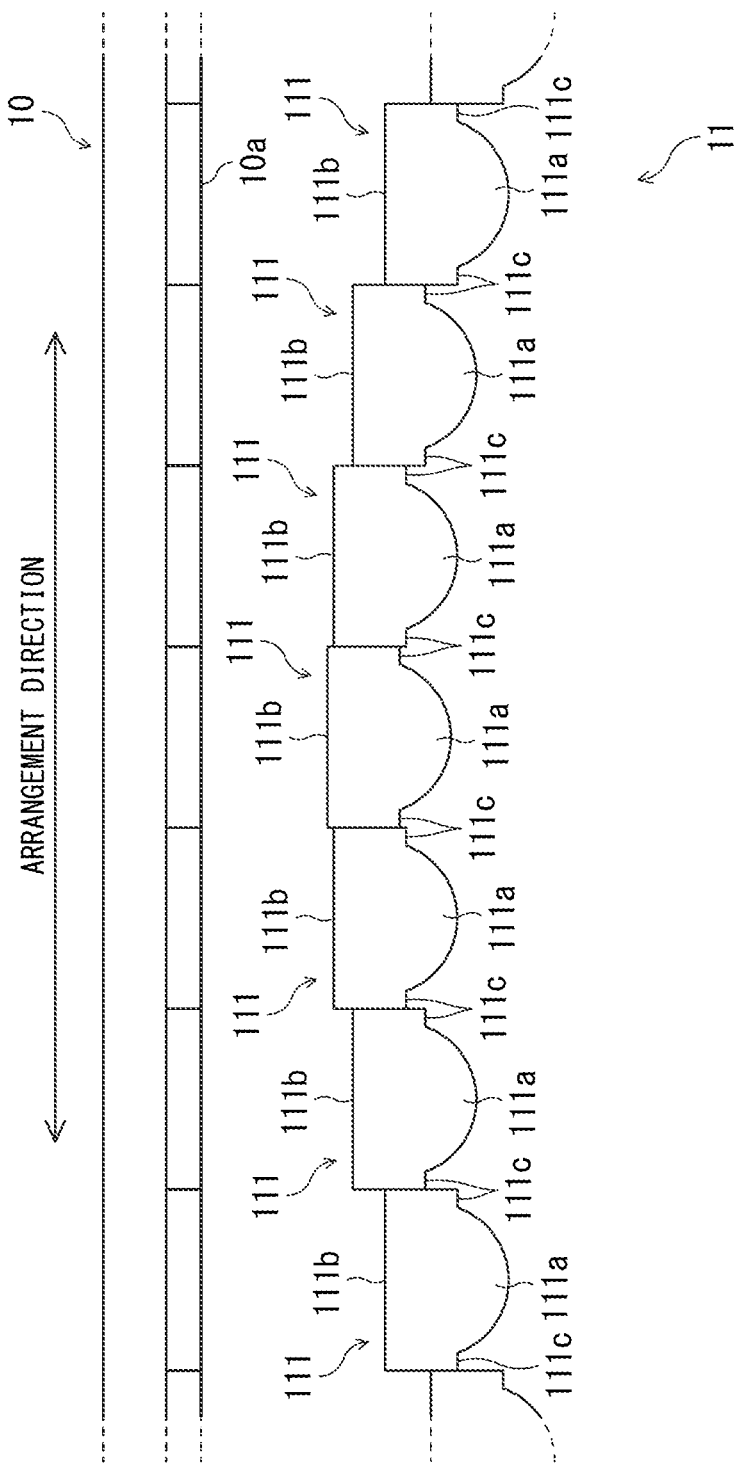
FIG. 3 is a schematic cross-sectional diagram illustrating a configuration of a lens sheet of the stereoscopic image display apparatus according to the embodiment.
Figure 4:
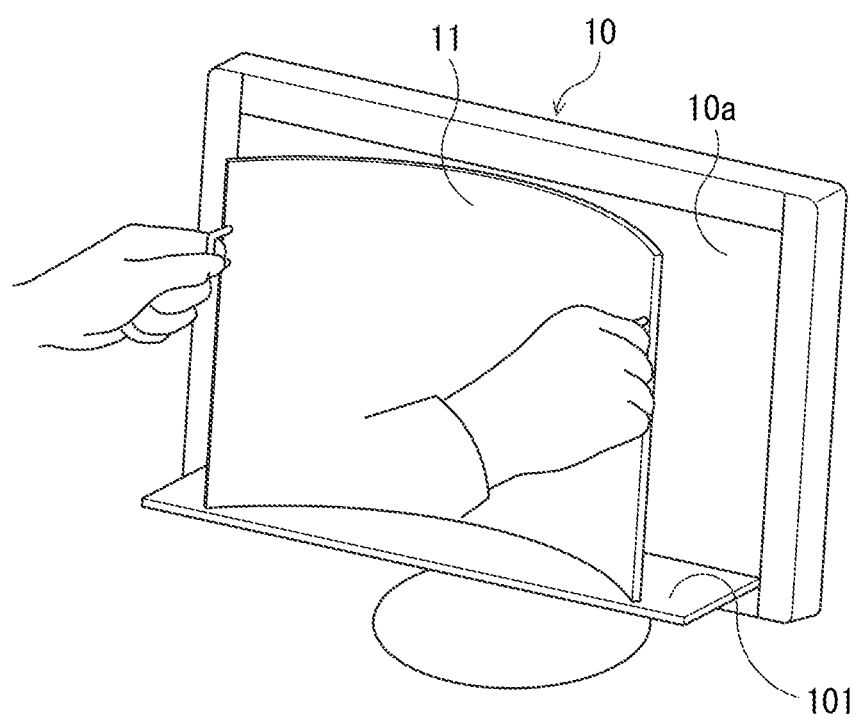
FIG. 4 is a diagram illustrating an example of installation of a lens sheet on a display device in the stereoscopic image display apparatus according to the embodiment.

FIG. 1 is a schematic diagram illustrating a configuration of a stereoscopic image display apparatus 1 according to the embodiment, and FIG. 2 is a diagram illustrating an example of arrangement of display elements of a display device 10. In addition, FIG. 3 is a schematic cross-sectional diagram illustrating a configuration of the lens sheet 11 of the stereoscopic image display apparatus 1 according to the embodiment, and FIG. 4 is a diagram illustrating an example of installation of the lens sheet 11 on the display device 10.

In the stereoscopic image display apparatus 1, a viewer is positioned so as to face the display device 10 where the lens sheet 11 is installed on a display surface 10a (for example, refer to FIG. 21), and a stereoscopic display image is displayed on the display surface 10a, so that the viewer can recognize a stereoscopic image of a display object.

Herein, the stereoscopic image (3D image) displayed in the stereoscopic image display apparatus 1 may be a moving picture or a still image.

Figure 13:
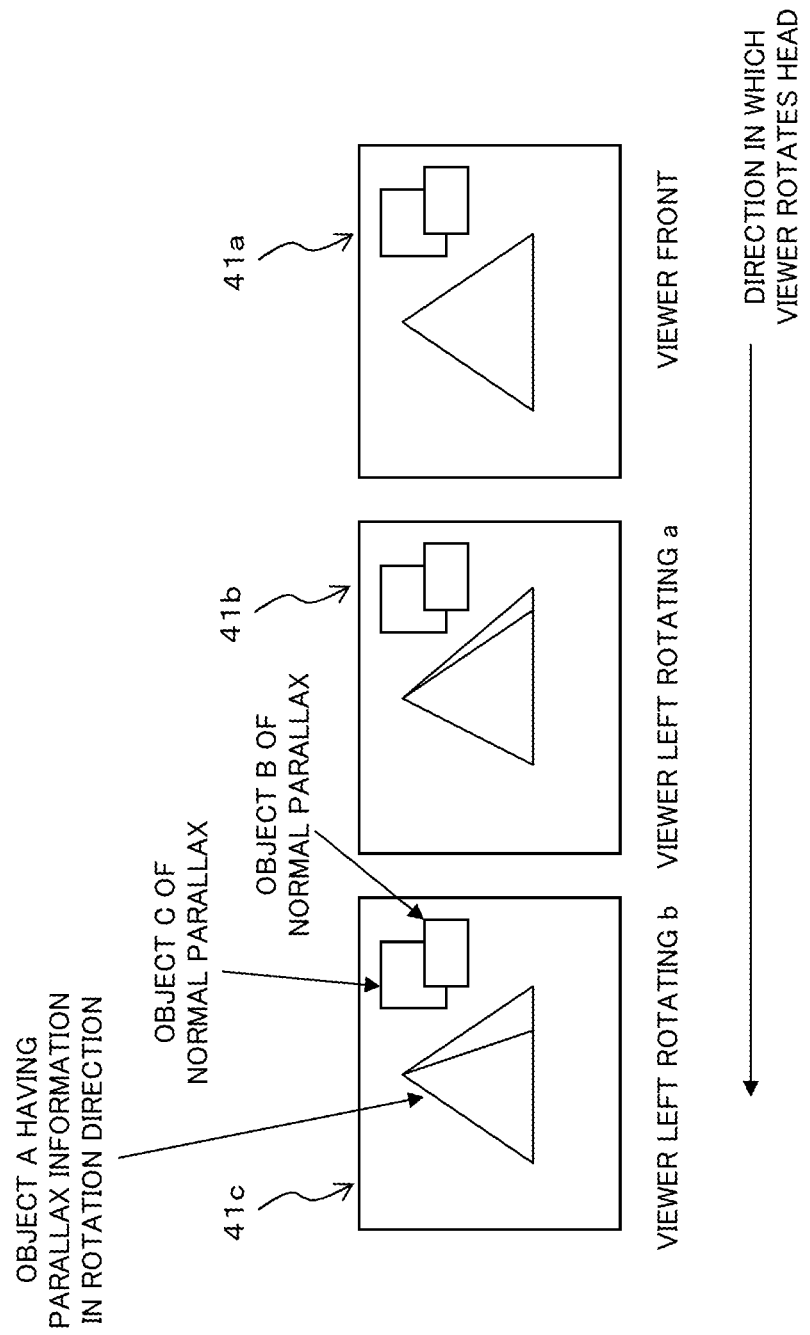
FIG. 13 is a diagram illustrating display images of stereoscopic images in the stereoscopic image display apparatus according to the embodiment.

Next, the viewer rotates the head portion about a specific portion (for example, the neck or the spine) of the body in one of the right and left directions about the position, so that the data (wraparound image) of the stereoscopic display image of the side surface portion of the display object is displayed on the display device 10 according to the rotation of the head portion (refer to FIG. 13). Therefore, according to the rotation of the head portion of the viewer, wraparound 3D display function of allowing the stereoscopic image displayed on the display device 10 to seem to be rotated can be implemented, so that a circular stereoscopic viewed image effect can be obtained.

As illustrated in FIG. 1, the stereoscopic image display apparatus 1 according to the embodiment is configured to include a display device 10, a lens sheet 11, a camera 12, and a display control device 13.

The display device 10 is, for example, a liquid crystal display and displays an image on a display surface 10a thereof under the control of the display control device 13.

In the embodiment, the stereoscopic image display apparatus 1 is illustrated as an example of a desktop PC having, for example, a wide liquid crystal display having a size of 27 inch or more. Namely, the display device 10 is a liquid crystal display having a size of 27 inch or more.

In the stereoscopic image display apparatus 1, a stereoscopic image is displayed on the display device 10. The stereoscopic image includes a left-eye image and a right-eye image.

The display surface 10a is formed as a flat plane, and a plurality of color pixel elements (display elements) are arranged on the display surface 10a in the horizontal direction of the display surface 10a and the direction perpendicular to the horizontal direction. A plurality of the pixels constituting an image displayed on the display surface 10a are represented by display elements.

More specifically, each pixel includes a plurality of color pixels. An example of the color pixels is color pixels constituting three primary colors of light, that is, red (R), green (G), and blue (B), and in the display surface 10a, the color pixel elements are repeatedly arranged in a predetermined order in the arrangement direction. In addition, in the orthogonal direction to the arrangement direction, the color pixels in the same type are consecutively arranged. A black matrix may be installed in the boundary portion of the pixels. In the display surface 10a, one pixel is represented by consecutive three color pixel elements R, G, and B.

In the example illustrated in FIG. 2, for example, a pixel 1L includes a pixel R1 (red), a pixel G1 (green), and a pixel B1 (blue). The same description is applied to other pixels such as a pixel 2R and a pixel 3L. Hereinafter, for the convenience, in the display surface 10a, the direction where plural types of the color pixels are to be repeatedly arranged is referred to as an arrangement direction; and in FIG. 2, the left/right direction on the surface of the paper is the arrangement direction.

In addition, in the example illustrated in FIG. 2, the color pixels of one pixel are arranged so as to be nonparallel to the pixel arrangement direction (the horizontal direction in the embodiment). However, the present invention is not limited thereto, but various changes may be available. The color pixels of one pixel may be arranged to be parallel to the pixel arrangement direction.

As illustrated in FIG. 3, the lens sheet 11 is formed as a lens array where a plurality of semicylindrical plano convex lenses 111 are consecutively installed in the arrangement direction of the display surface 10a. Namely, the lens sheet 11 is configured in a lenticular lens shape where longitudinal semicylindrical convex lenses are consecutively arranged in the same direction.

The lens sheet 11 is configured on the display surface 10a side of the display device 10 by arranging the convex lens 111a protruding from each of the plano convex lenses 111 and the opposite surface (hereinafter, referred to as a rear plane 111b) to face the display surface 10a of the display device 10.

In addition, as illustrated in FIG. 3, planar lens groove portions 111c are formed at two sides of the convex lens 111a of the plano convex lens 111.

In addition, in the lens sheet 11, the optical axes of the convex lenses 111a of the plano convex lenses 111 are arranged to be parallel to each other, so that the plano convex lenses 111 are formed in the same direction.

In addition, in the lens sheet 11, each plano convex lens 111 corresponds to one pixel of the display surface 10a in the arrangement direction. Therefore, light beams irradiated from each pixel facing in the display surface 10a side are incident on each plano convex lens 111. In addition, light beams incident on the rear plane 111b of the each plano convex lens 111 are emitted from each convex lens 111a to be focused on a position of a predetermined focal length.

The plano convex lenses 111 are formed by using the same material and have the same shape such as the same ratio of curvature of the convex lenses 111a and the same distance from the convex lenses 111a to the rear plane 111b. Therefore, the f values thereof are the same.

In addition, as illustrated in FIG. 3, the plano convex lenses 111 are arranged so as for the distances to the display surface 10a to be changed stepwise, so that the plano convex lens at the central position in the arrangement direction is positioned nearest to the display surface 10a of the display device 10 and the plano convex lenses at the two end portions in the arrangement direction are farthest from the display surface 10a of the display device 10. Namely, in the arrangement direction, the distances from the pixels of the display surface 10a to the rear planes 111b of the lens sheet 11 are not uniform. Particularly, in the half surface from the central portion to the end portion in the arrangement direction of the display device 10, the distances from the pixels to the rear planes 111b of the plano convex lenses 111 are different from each other.

Therefore, in the half surface from the central portion to the end portion in the arrangement direction of the display device 10, light beams emitted from the display surface 10a and pass through the plano convex lenses 111 are focused on different positions.

The lens sheet 11 is configured in a curved structure (concave structure) where the protruding directions (lens array directions) of the plano convex lenses 111 are uniform and the distances from the pixels of the display surface 10a of the display device 10 to the plano convex lenses 111 are changed stepwise.

In addition, as illustrated in FIG. 4, the lens sheet 11 is fixed and installed at a predetermined position in front (viewer side) of the display surface 10a of the display device 10. The installation of the lens sheet 11 on the display device 10 is performed, for example, by fixing to a hook (not illustrated) or the like. In addition, for example, a sensor (not illustrated) of sensing the installation of the lens sheet 11 is provided to the display device 10, so that information as to whether or not the lens sheet 11 is installed is notified to the display control device 13. In addition, a 3D panel ID (identification information) for identifying a type or the like of the lens sheet 11 is provided to the lens sheet 11.

For example, a non-contact ID tag storing the 3D panel ID is provided to the lens sheet 11, and an ID tag reader is provided to the display device 10, so that the display device 10 can acquire the 3D panel ID.

The display device 10 transmits the acquired 3D panel ID to the display control device 13.

In the stereoscopic image display apparatus 1, since one lens array (one plano convex lens 111) is allowed to correspond to one pixel of the display surface 10a, light beams of the one pixel can be imaged without a decrease in intensity of light (amount of light) and with an accurate focal length a.

The camera 12 is an image pickup device (image pickup unit) which captures the face of the viewer. For example, the camera 12 is installed at a position in front of the viewer such as at the top portion of the display device 10 to image the face (particularly, two eyes) of the viewer. For example, a web camera which can be installed in a personal computer (PC) may be used as the camera 12. In addition, for example, the camera 12 may be buried in a frame (not illustrated) of the display device 10, and the arrangement thereof may be appropriately changed.

The image captured by the camera 12 is transmitted to the display control device 13. Preferably, at the time of displaying the stereoscopic image, the camera 12 continuously transmits the captured image to the display control device 13.

Figure 5:
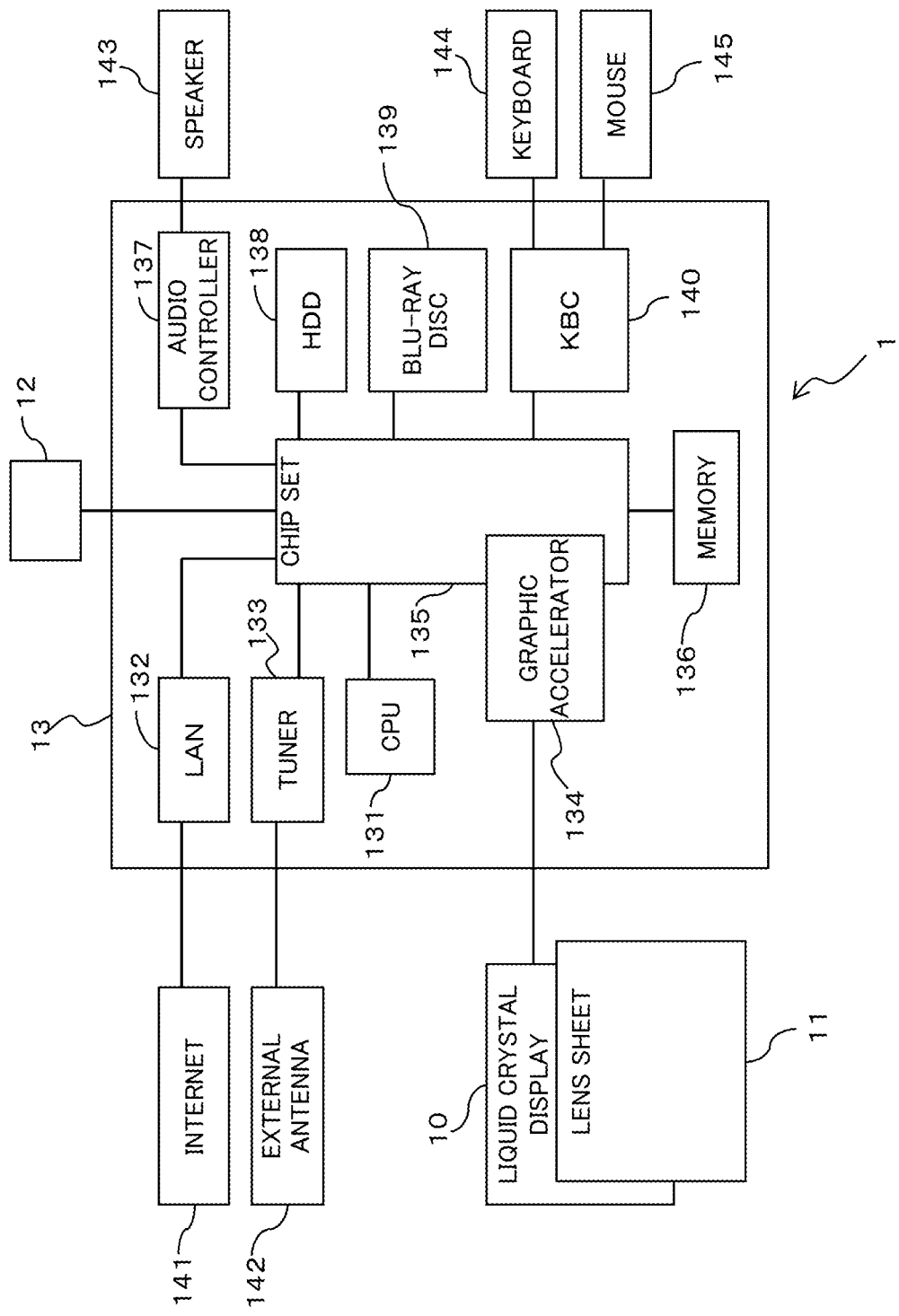
FIG. 5 is a schematic diagram illustrating a hardware configuration of a display control device of the stereoscopic image display apparatus according to the embodiment.

FIG. 5 is a schematic diagram illustrating a hardware configuration of the display control device 13 of the stereoscopic image display apparatus 1 according to the embodiment.

As illustrated in FIG. 5, the display control device 13 is configured, for example, as an information processing apparatus (computer) including a central processing unit (CPU) 131, a local area network (LAN) card 132, a tuner 133, a graph accelerator 134, a chip set 135, a memory 136, an audio controller 137, a hard disk drive (HDD) 138, a Blu-ray disc drive 139, and a keyboard controller 140.

The graph accelerator 134 is an image display control interface which is connected to the display device 10 to allow the display device 10 to perform image display. The LAN card 132 is an interface card for connecting to a network such as the Internet 141. The tuner 133 is connected to an external antenna 142 to receive a TV program and performs a decoding process and the like to display image data on the display device 10.

The memory 136 is a storage device such as a random access memory (RAM) or a read only memory (ROM) and stores various programs or data executed or used by the CPU 131.

The audio controller 137 is connected to a speaker 143 to control audio data output of the speaker 143.

The HDD 138 is a storage device and stores an operating system (OS), various programs, data, and the like executed or used by the CPU 131. In addition, the HDD 138 or the memory 136 may also store various image data (image data and stereoscopic image data) displayed on the display device 10.

In addition, as described later, the HDD 138 stores the stereoscopic image data which are produced in advance with respect to a stereoscopic display object (display object). Namely, the HDD 138 functions as a storage unit which stores stereoscopic display images of parallax points of the display object in correspondence with a plurality of viewing points.

The Blu-ray disc drive 139 reproduces a Blu-ray disc. In addition, the Blu-ray disc may also store various image data (image data and stereoscopic image data) displayed on the display device 10.

The keyboard controller 140 is connected to an input device such as a keyboard 144 or a mouse 145 to control data communication between the keyboard 144 or the mouse 145 and the CPU 131. The chip set 135 is connected to the above-mentioned components through a bus or the like to control communication between the CPU 131 and the components. In addition, the display control device 13 is connected to the camera 12 to receive the face image of the viewer captured by the camera 12.

The CPU 131 is a processing device implementing various functions by executing programs stored in the HDD 138 or the memory 136.

The CPU 131 executes, for example, an image reproduction application (wraparound-image reproduction application) to display content such as a moving picture or a still image (wraparound-image reproduction application image) on the display surface 10a of the display device 10.

In addition, in the stereoscopic image display apparatus 1, as illustrated in FIG. 1, the CPU 131 functions as a sensing unit 31, a selection unit 32, and a display controller 33. In addition, the above-described image reproduction application also includes functions of the sensing unit 31, the selection unit 32, and the display controller 33.

In addition, a program (image reproduction application) for implementing functions as the sensing unit 31, the selection unit 32, and the display controller 33 is provided in a form of being recorded on a computer-readable recording medium such as a flexible disc, a CD (CD-ROM, CD-R, CD-RW, or the like), a DVD (DVD-ROM, DVD-RAM, DVD-R, DVD+R, DVD-RW, DVD+RW, or the like), a magnetic disc, an optical disc, and an opto-magnetic disc. In addition, a computer uses the program by reading the program from the recording medium and transmitting the program to an internal storage device or an external storage device to store the program. In addition, the program may be recorded on a storage device (recording medium) such as a magnetic disc, an optical disc, and an opto-magnetic disc and are provided from the storage device to the computer through a communication line.

In order to implement the functions of the sensing unit 31, the selection unit 32, and the display controller 33, the program stored in the internal storage device (memory 136 in the embodiment) is executed by a microprocessor (CPU 131 in the embodiment) of the computer. At this time, the program recorded on the recording medium may be read by the computer.

In addition, in the embodiment, the computer has a concept including hardware and an operating system and denotes hardware operated under the control of the operating system. In addition, in the case where the hardware is operated only by an application program and the operating system is unnecessary, the hardware itself corresponds to the computer. The hardware includes at least a microprocessor such as a CPU and a device for reading a computer program recorded in a recording medium. In the embodiment, the stereoscopic image display apparatus 1 has a function as a computer.

Figure 6A:
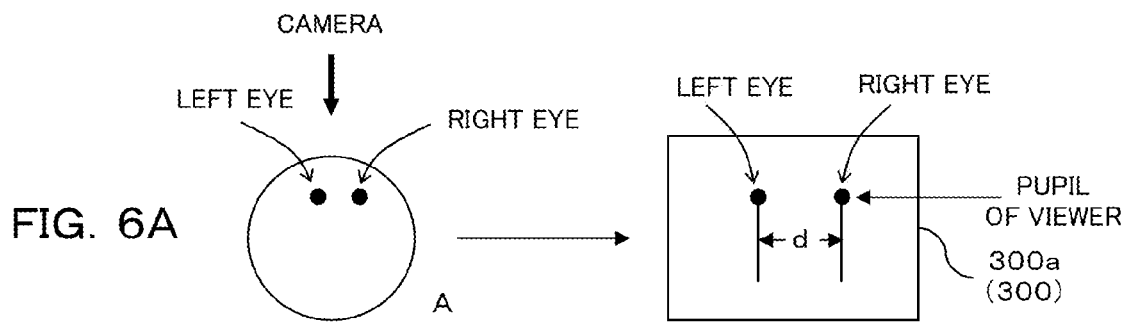
FIGS. 6A, 6B, and 6C are diagrams illustrating face directions and face images of viewers.
Figure 6B:
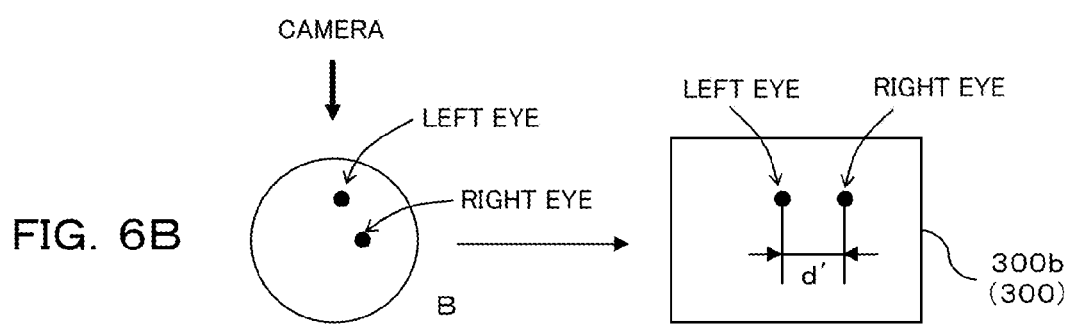
Figure 6C:
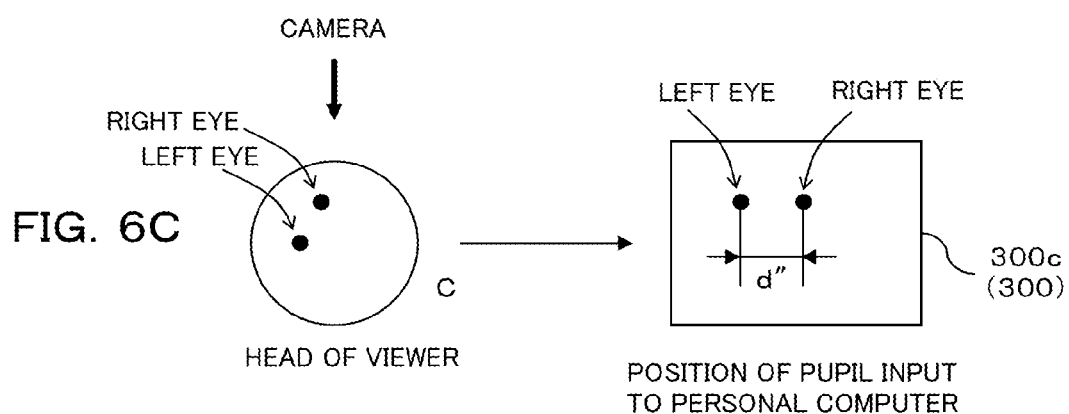

FIGS. 6A, 6B, and 6C are diagrams illustrating face directions and face images 300 of the viewer. FIG. 6A illustrates the face direction and the face image 300a in the state where the viewer is directed toward the front side. In addition, FIG. 6B illustrates the face direction and the face image 300b in the state where the viewer is directed toward the right side, and FIG. 6C illustrates the face direction and the face image 300c in the state where the viewer is directed toward the left side.

The face images 300 in FIGS. 6A, 6B, and 6C are captured by the camera 12 and are transmitted to the display control device 13 through communication devices such as USB cables.

In addition, hereinafter, with respect to reference numerals denoting face images, the reference numerals 300a, 300b, and 300c are used to specify one of a plurality of face images; and the reference numeral 300 is used to indicate an arbitrary face image. In addition, the face image 300 may be a moving picture or a still image.

The sensing unit 31 analyzes the face image 300 of the viewer captured by the camera 12 and recognizes positions of two eyes (pupils) from the face image 300 to determine the face direction or the inter-eye distance of the viewer based on the positions of the two eyes.

Next, the sensing unit 31 senses the rotation amount of the head portion rotated around the neck of the viewer as an axis by sensing a change in the positions of the two eyes or the inter-eye distance. Namely, the sensing unit 31 senses a posture changing amount of a visual organ of a person.

The sensing unit 31 determines which one of the right and left directions the rotation direction of the head of the viewer is. At this time, the face recognition or the identification of the viewing position of the viewer is not necessary. For example, the color of the pupils of the two eyes of the viewer may be used as input data, and the determination may be performed by using the position relation in the face image 300 captured by the camera 12.

The sensing unit 31 may recognize only the existence of the two eyes in the face image 300 as an object. For example, a camera having a high resolution and a high frame rate for tracking the two eyes is not needed. In addition, a highly functional system configuration for checking a viewing position and a viewing distance of the viewer such as an infrared camera is not also needed. This is because the determination as to which one of the right and left directions the face is directed to may be performed by determining which one of the right and left directions the two eyes are moved in the image captured by the camera 12. Therefore, the apparatus can be implemented at a low production cost.

The sensing unit 31 performs recognition of the positions of the two eyes of the viewer by using shapes or colors of the two eyes. For example, in the case where the recognition of the two eyes is performed by using the color, the recognition of black eyes is performed by using contrast or the like.

In addition, the recognition of the positions of the two eyes may be performed through image recognition. The sensing unit 31 recognizes the rotation amount or the rotation angle of the head portion based on the face image 300 captured by the camera 12. Next, the sensing unit 31 compares the face image 300 captured by the camera 12 with the below-described basic inter-eye distance.

Figure 7:
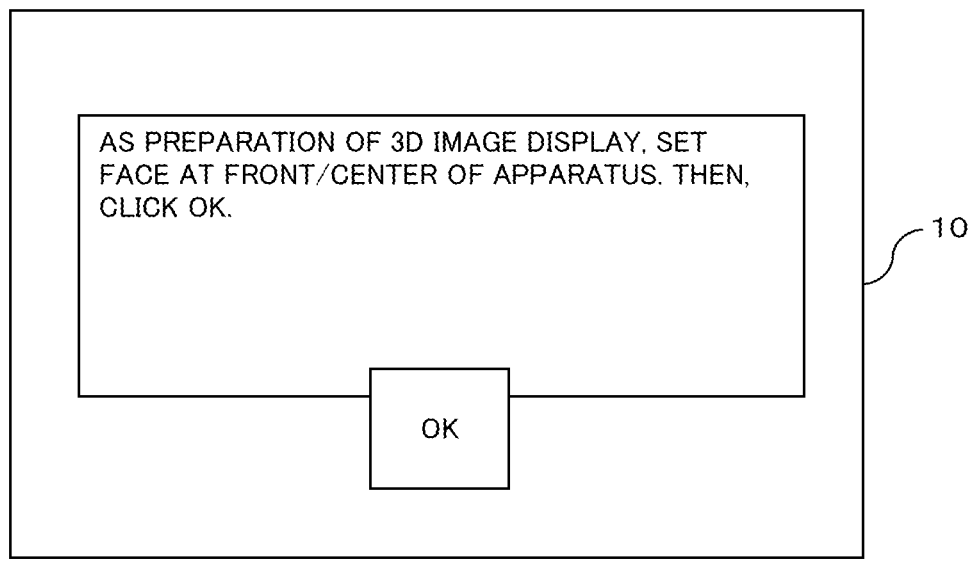
FIG. 7 is a diagram illustrating a dialog box in the stereoscopic image display apparatus according to the embodiment.

When the recognition of the face direction of the viewer is to be started, the sensing unit 31 displays a dialog box illustrated in FIG. 7 on the display device 10.

FIG. 7 is a diagram illustrating an example of a dialog box in the stereoscopic image display apparatus 1 according to the embodiment.

If the viewer is positioned in front of the display device 10 (camera 12) at a position where the distance to the display device 10 is predefined and then selects "OK" by manipulating the keyboard 144 or the mouse 145 in response to a message of the dialog box, the detection of the face direction is started.

The sensing unit 31 senses the two eyes of the viewer as black circles positioned to be separated by a certain distance in the face image 300 to recognize the two eyes.

Therefore, first, as illustrated in FIG. 6A, the face image 300a is captured in the state where the viewer is directed toward the front side. The positions of the two eyes in the state where the viewer at a regulated position is directed to the front side (positioned in front of the display device; rotation angle of 0°) are a basic position, or the inter-eye distance in the state is a basic inter-eye distance d. Namely, the sensing unit 31 recognizes the basic positions of the two eyes and the basic inter-eye distance based on the face image 300a in the state where the viewer is directed to the front side.

In addition, the sensing unit 31 analyzes the face image 300 transmitted from the camera 12 at all times and recognizes a change in the positions of the two eyes or a change in the inter-eye distance in the face image 300. Next, if it is sensed that the two eyes are moved with a certain amount and, simultaneously, the inter-eye distance is decreased, the sensing unit 31 recognizes based on the result of the sensing that the head portion of the viewer is rotated.

For example, the sensing unit 31 determines the rotation direction of the face of the viewer (as to which one of the right and left directions the face is rotated) by comparing the positions of the two eyes in the newly acquired face image 300 with previously recognized basic positions of the two eyes. In addition, the sensing unit 31 determines the rotation amount of the face of the viewer by comparing the inter-eye distance in the newly acquired face image 300 with a previously recognized basic inter-eye distance.

As illustrated in FIGS. 6B and 6C, in the case where the viewer rotates the head portion of the viewer about the neck as a rotation axis in any one of the right and left directions, as illustrated in the face images 300b and 300c, the inter-eye distances d' and d" are decreased in comparison with the basic inter-eye distance d in the face image 300a illustrated in FIG. 6A. In addition, as the rotation angle of the head portion of the viewer is increased, the inter-eye distances d' and d" are decreased.

Therefore, the sensing unit 31 checks the rotation amount of the head portion of the viewer, for example, by comparing the measured inter-eye distance in the face image 300 with the basic inter-eye distance d.

In the embodiment, as described above, by comparing the measured inter-eye distance in the face image 300 with the basic inter-eye distance d, the rotation amount of the head portion of the viewer is checked. The information indicating the rotation direction of the head of the viewer is the right or left side or indicating an angle at which the head of the viewer is directed from the front side of the display device 10 is referred to as sensor information.

In the embodiment, for example, by comparing a ratio or difference between the measured inter-eye distance and the basic inter-eye distance d with a preset threshold value, the rotation amount of the head portion of the viewer is expressed by a level.

For example, the range from the state where the viewer is positioned in front of the display surface 10a (rotation angle of 0°; Level 0) to the state where the viewer is directed just to any one of the right and left directions (rotation angle of 90°) is divided into a predetermined number n (for example, n=20) of levels (for example, 0 to 19). The sensing unit 31 determines which level the rotation angle of the head portion of the viewer is included in based on the measured inter-eye distance. In addition, the level division is performed in each of the right and left directions.

The sensing unit 31 notifies the result of detection as the rotation direction (rightwards or leftwards) and the rotation level n (n is a natural number of, for example, 0 to 19) to the selection unit 32. In addition, the sensing unit 31 may notify the level in response to the data request from the selection unit 32. The selection unit 32 determines the to-be-displayed pixel group based on the level information (numerical value) notified from the sensing unit 31.

In addition, the sensing unit 31 notifies information on, for example, the rotation direction of the head portion of the viewer and the rotation angle from the front side of the display surface 10a and a level value as a result of determination to the selection unit 32.

If the sensing unit 31 recognizes that the head portion of the viewer is rotated, the selection unit 32 selects the stereoscopic display images (left-eye stereoscopic display image and right-eye stereoscopic display image) corresponding to the level value from the HDD 138 according to the level value (rotation amount) sensed by the sensing unit 31.

In addition, plural types of stereoscopic display images corresponding to the types (3D panel IDs) of the lens sheet 11 are stored in the HDD 138, and the selection unit 32 selects the stereoscopic display image corresponding to the 3D panel ID of the lens sheet 11.

The stereoscopic display image selected by the selection unit 32 is displayed on the display control device 13 by the display controller 33. Namely, the image (pixel group) displayed on the display device 10 is changed in accordance with the rotation movement of the head portion of the viewer.

In addition, the case where the inter-eye distance is not changed although the movement of the two eyes is sensed is that the viewer moves only in one of the right and left directions in the state where the viewer faces the display device 10. In this case, the stereoscopic display image (pixel group) displayed on the display device 10 is not changed.

Figure 8:
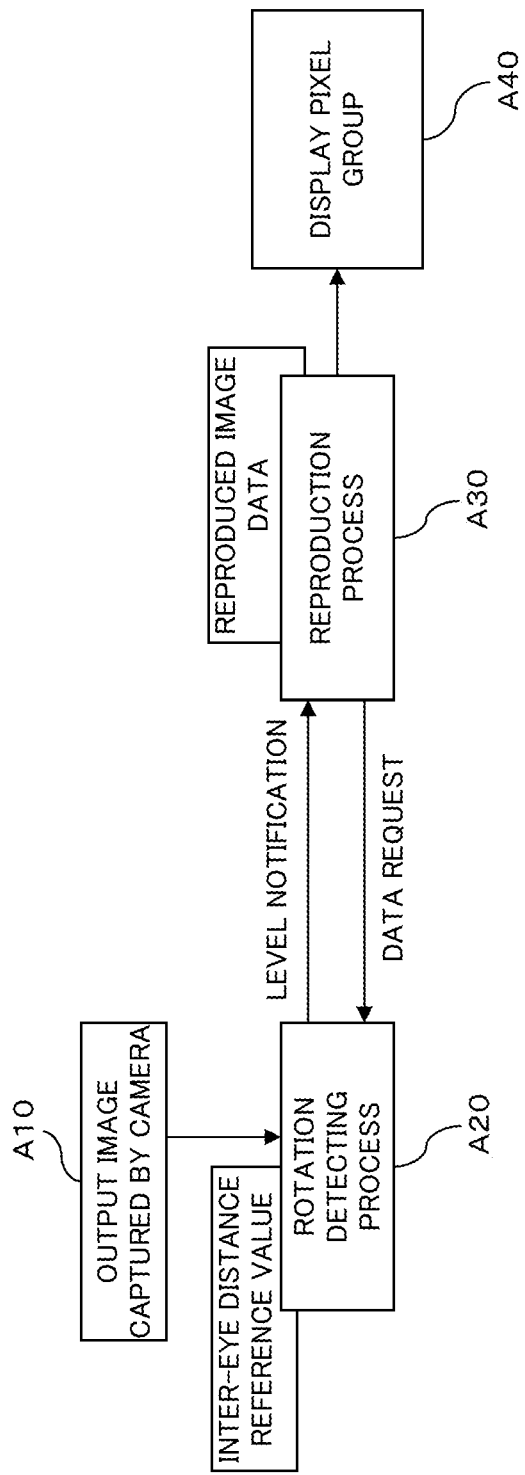
FIG. 8 is a schematic block diagram illustrating a functional configuration of the stereoscopic image display apparatus according to the embodiment.

FIG. 8 is a schematic block diagram illustrating a functional configuration of the stereoscopic image display apparatus 1 according to the embodiment.

As illustrated in FIG. 8, the camera 12 outputs the face image 300 of the viewer (A10), and next, the sensing unit 31 performs the rotation sensing process of sensing the rotation of the head portion of the viewer (A20). In the rotation sensing process, basic positions of the two eyes and a basic inter-eye distance of the viewer are recognized, and the basic inter-eye distance is used as an inter-eye distance reference value. The result of the rotation sensing process is notified as a level notification, and the procedure proceeds to a reproduction process (A30). In addition, the level notification may be performed in response to the data request of the selection unit 32.

In the reproduction process, the selection unit 32 selects the stereoscopic display image stored in the HDD 138 based on the notified level, and the display controller 33 displays the pixel group of the stereoscopic display image on the display device 10 (A40).

Next, a pixel group arrangement as a stereoscopic display image will be described. In the stereoscopic image display apparatus 1, the stereoscopic display image is replaced according to the level.

FIGS. 9A and 9B are diagrams illustrating examples of stereoscopic display images in the stereoscopic image display apparatus 1 according to the embodiment. FIG. 9A is a diagram illustrating an example of a stereoscopic display image at Level 0, and FIG. 9B is a diagram illustrating an example of a stereoscopic display image at Level 1.

A stereoscopic display image for the left eye (left-eye stereoscopic display image) 40L and a stereoscopic display image for the right eye (right-eye stereoscopic display image) 40R for each level (for each of the viewing points) illustrated in FIGS. 9A and 9B are stored in the HDD 138 in advance.

The left-eye stereoscopic display image 40L is an image displayed on the display surface 10a and a set of pixels which are imaged at the left eye (first viewing point) of the viewer by satisfying the focal length, and is configured as a pixel group arrangement. In addition, the right-eye stereoscopic display image 40R is an image displayed on the display surface 10a and a set of pixels which are imaged at the right eye (second viewing point) of the viewer by satisfying the focal length, and is configured as a pixel group arrangement.

The left-eye stereoscopic display image 40L and the right-eye stereoscopic display image 40R are designed to have a predetermined parallax. Therefore, the left-eye stereoscopic display image is focused on the left eye, and the right-eye stereoscopic display image is focused on the right eye; and in this state, the viewer can stereoscopically recognize the stereoscopic display image.

Hereinafter, each of the viewing points having a parallax is referred to as a parallax point. In the stereoscopic image display apparatus 1, binocular parallax stereoscopic viewing by using binocular parallax is implemented, and the right and left eyes of the viewer become parallax points. Namely, the HDD 138 stores left-eye and right-eye stereoscopic display images which are produced to have parallax corresponding to the right and left eyes as the parallax points.

In addition, the stereoscopic display image is configured to include images of the display object viewed from a plurality of positions on the outer circumference, and for example, the stereoscopic display image includes a plurality of images of the outer circumference of the display object captured along a horizontal plane in a predetermined angle interval. In addition, the predetermined angle interval is defined according to the above-described number of levels, and for example, the predetermined angle interval is obtained from "predetermined angle=360/(number of levels)". Namely, as the above-described number of levels is increased, the number of generated stereoscopic display images is increased.

The stereoscopic display image is an image of the outer appearance of the display object viewed from a plurality of positions (viewing points) on the outer circumference with respect to the display object. For example, the stereoscopic display image includes an image of the display object viewed from the front position (angle of 0°), images of the vicinity of the display object from the front position viewed from the positions (viewing points) of angles of 20°, 40°, 60°, and 80° with respect to the right side, and images of the vicinity of the display object viewed from the positions (viewing points) of angles of 20°, 40°, 60°, and 80° with respect to the left side.

The images of the outer appearance of the display object at the viewing points are selected by the below-described selection unit 32 based on the level value obtained by the sensing unit 31 and are displayed on the display device 10. Preferably, each of the stereoscopic display images is stored in the HDD 138, for example, in correspondence with the level value in advance.

In addition, in the case where there is no stereoscopic display image corresponding to the level value obtained by the sensing unit 31 with respect to the display object, the selection unit 32 may select a stereoscopic display image closest to the obtained level value by appropriately changing a selecting condition.

In the example illustrated in FIGS. 9A and 9B, for the convenience, arrays of 3×4 (=12) display elements are extracted from the left-eye stereoscopic display image 40L and the right-eye stereoscopic display image 40R displayed on the display surface 10a to be illustrated.

If the sensing unit 31 senses that the posture of the head portion of the viewer is Level 0 (rotation angle 0°), the selection unit 32 acquires the stereoscopic display image corresponding to Level 0 as illustrated in FIG. 9A.

In the pixel group arrangement constituting the left-eye stereoscopic display image 40L of Level 0 illustrated in FIG. 9A, one pixel is expressed by (R, G, B)=(L3Rk0, L3Gk0, L3Bk0), and one pixel adjacent to the aforementioned pixel is expressed by (R, G, B)=(L4Rk0, L4Gk0, L4Bk0).

Similarly, in the pixel group arrangement constituting the right-eye stereoscopic display image 40R, one pixel is expressed by (R, G, B)=(R3Rk0, R3Gk0, R3Bk0), and one pixel adjacent to the aforementioned pixel is expressed by (R, G, B)=(R4Rk0, R4Gk0, R4Bk0).

Next, in the state of Level 0, if the sensing unit 31 senses that the head portion of the viewer is rotated by Level 1 leftwards, as illustrated in FIG. 9B, the selection unit 32 acquires a stereoscopic display image corresponding to Level 1 and changes the stereoscopic display image which is to be displayed on the display device 10.

In the pixel group arrangement constituting the left-eye stereoscopic display image 40L of Level 1 illustrated in FIG. 9B, one pixel is expressed by (R, G, B)=(L3R11, L3G11, L3B11), and one pixel adjacent to the aforementioned pixel is expressed by (R, G, B)=(L4R11, L4G11, L4B11).

Similarly, in the pixel group arrangement constituting the right-eye stereoscopic display image 40R, one pixel is expressed by (R, G, B)=(R3R11, R3G11, R3B11), and one pixel adjacent to the aforementioned pixel is expressed by (R, G, B)=(R4R11, R4G11, R4B11).

Figure 10:
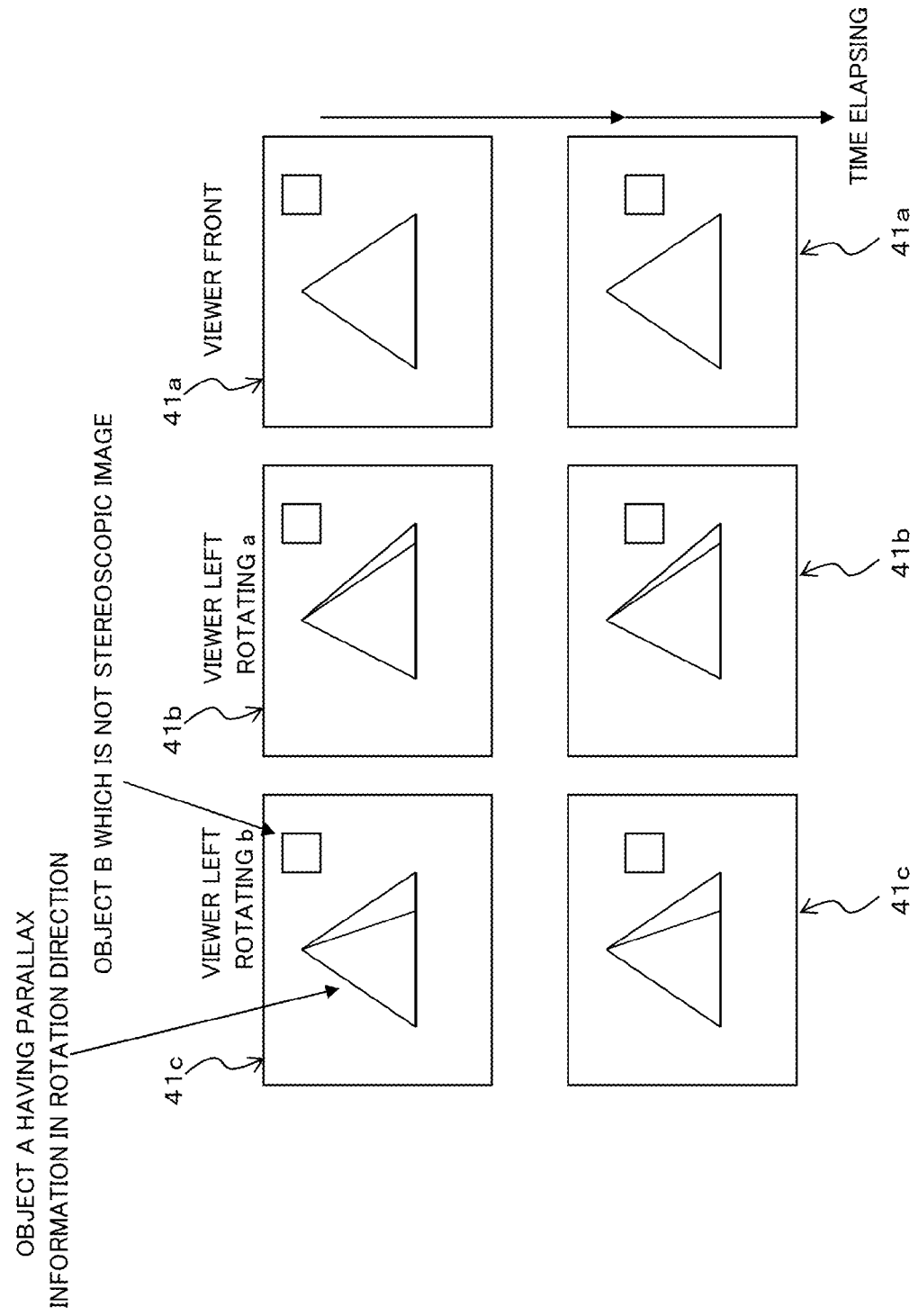
FIG. 10 is a diagram illustrating format images of stereoscopic image data of display objects in the stereoscopic image display apparatus according to the embodiment.

FIG. 10 is a diagram illustrating a format image of stereoscopic image data (3D image data) of display objects in the stereoscopic image display apparatus 1 according to the embodiment. FIG. 10 illustrates images of display objects viewed as a stereoscopic display image by a viewer. FIG. 10 illustrates a plurality of items of stereoscopic image data 41a, 41b, and 41c including the display objects A and B. The stereoscopic image data 41a, 41b, and 41c may be changed as the time elapses.

The stereoscopic image data 41a represents an image displayed in the state where the viewer is directed to the front side (rotation angle of 0°). In addition, the stereoscopic image data 41b represents an image displayed in the state where the viewer rotates by an angle "a" leftwards, and the stereoscopic image data 41c represents an image displayed in the state where the viewer rotates by an angle "b" leftwards. Herein, it is assumed that a<b.

The left-eye stereoscopic display image 40L and the right-eye stereoscopic display image 40R of each item of the stereoscopic image data 41a, 41b, and 41c are stored as the stereoscopic display images in the HDD 138.

For example, in the state where the viewer-front images (left-eye stereoscopic display image 40L and right-eye stereoscopic display image 40R) of the stereoscopic image data 41a are displayed, if the sensing unit 31 senses that the viewer directs to the left side by Level 1, the selection unit 32 selects the left-eye stereoscopic display image 40L and the right-eye stereoscopic display image 40R of the stereoscopic image data 41b corresponding to Level 1 and allows the display controller 33 to display the images.

If the sensing unit 31 senses that the viewer directs to the left side by Level 2, the selection unit 32 selects the left-eye stereoscopic display image 40L and the right-eye stereoscopic display image 40R of the stereoscopic image data 41c corresponding to the Level 2 and allows the display controller 33 to display the images.

In addition, with respect to the stereoscopic image data 41a, 41b, and 41c, although the object A has parallax information in the rotation direction, the object A is not moved as an object; and although the object B does not have parallax information in the rotation direction, the object B is moved as an object and thus is moved as a time elapses.

With respect to the stereoscopic display image, the three items of stereoscopic image data 41a, 41b, and 41c may be simultaneously included in, for example, one moving picture data and may be used as various format data.

Figure 11:
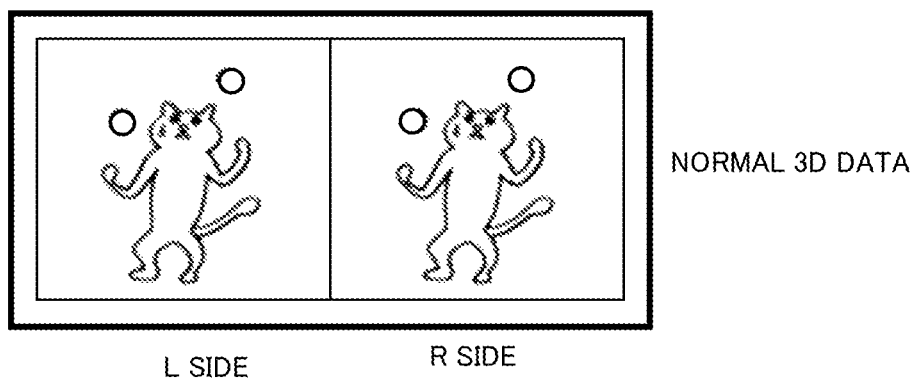
FIG. 11 is a schematic diagram illustrating a side-by-side stereoscopic image format.

FIG. 11 is a schematic diagram illustrating a side-by-side stereoscopic image format. In the side-by-side stereoscopic image format, an image focused on the left eye (hereinafter, referred to as an L-side image) and an image focused on the right eye (hereinafter, referred to as an R-side image) exist in one frame. The viewer views the L-side image and the R-side image as different image frames.

Figure 12:
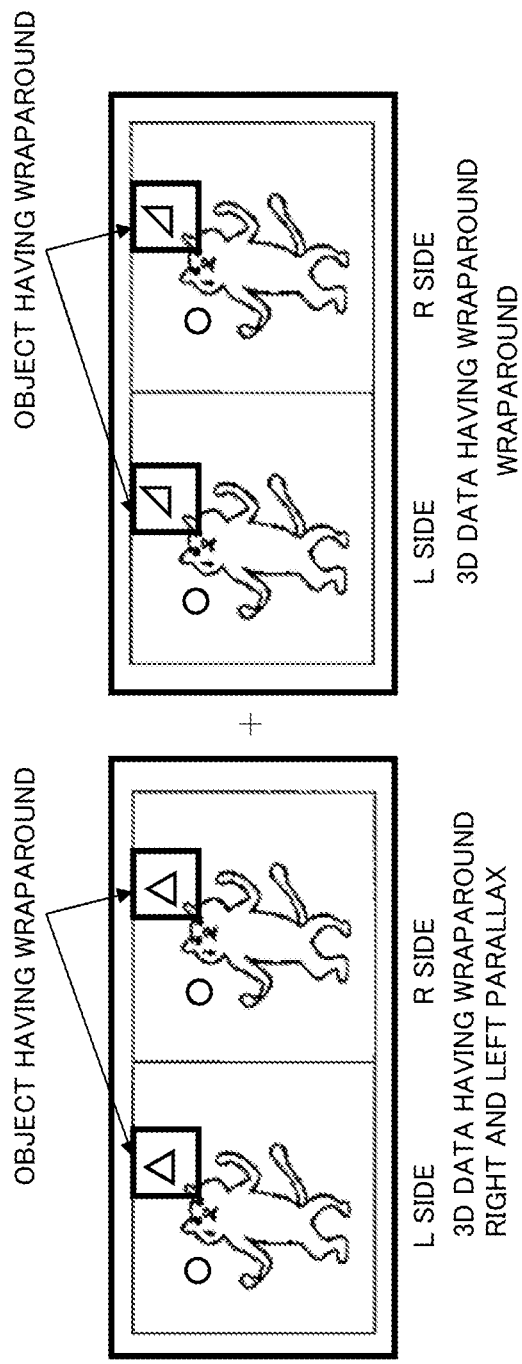
FIG. 12 is a diagram illustrating an example of data images of a stereoscopic display image.

FIG. 12 is a diagram illustrating data images of a stereoscopic display image and illustrates data images of a stereoscopic display image corresponding to wraparound in stereoscopic image reproduction display. In the example illustrated in FIG. 12, parallax information and additional information on a wraparound object are included as data of the stereoscopic display image. Namely, in addition to the image data having parallax information as side-by-side data, additional information on only the wraparound object is included as difference information of one frame. In addition, the display controller 33 may produce a wraparound image based on the difference information.

As the data of the stereoscopic display image illustrated in FIG. 12, in addition to the side-by-side stereoscopic display image format illustrated in FIG. 11, a wraparound image is input in image synchronization. Although the stereoscopic display image format is added according to the parallax amount, the wraparound data does not necessarily exist in the entire one frame as illustrated in FIG. 12. Namely, the additional information of a wraparound object is information requiring only the object having the wraparound information.

Therefore, since the added data may be data of only the object of which a wraparound image occurs, with respect to the size of the added data, the added data is configured in a format where only the additional information is added to a side-by-side stereoscopic display image format illustrated in FIG. 11. Therefore, an increase in data may be small, and thus, the amount of calculation for the image process is small. Accordingly, the reproduction can be performed in real-time. Therefore, if the viewer rotates the head portion, with respect to the object in the wraparound data illustrated in FIG. 12, the image effect illustrated in FIG. 13 for displaying other data can be obtained. The occurrence of a wraparound image depends on the depth direction, and due to the display of the side-surface data of the image, the depth direction of the image can be felt.

Next, display images of a stereoscopic image in the stereoscopic image display apparatus 1 according to the embodiment will be described with reference to an image diagram illustrated in FIG. 13.

FIG. 13 illustrates a plurality of items of stereoscopic image data 41a, 41b, and 41c having display objects A, B, and C.

The stereoscopic image data 41a represents an image displayed in the state where the viewer is directed to the front side (rotation angle of 0°). In addition, the stereoscopic image data 41b represents an image displayed in the state where the viewer rotates by an angle "a" leftwards, and the stereoscopic image data 41c represents an image displayed in the state where the viewer rotates by an angle "b" leftwards. Herein, it is assumed that a<b.

In addition, in the example illustrated in FIG. 13, it is assumed that the parallax amount in terms of the depth is increased in the order of the object A, the object B, and the object C.

In the case where the sensing unit 31 determines that the head portion of the viewer is not rotated, that is, the viewer is directed to the front side, the stereoscopic image data 41a is displayed with the parallax amounts at the two eyes with respect to the all the objects A, B, and C. For example, the stereoscopic display image is displayed in a side-by-side stereoscopic image format illustrated in FIG. 12.

In addition, in the case where the sensing unit 31 determines that the head portion of the viewer is rotated, for example, the viewer rotates the head portion by an angle "a" ("b") leftwards, the stereoscopic image data 41b (41c) is displayed, for example, in a stereoscopic image format illustrated in FIG. 12, so that the stereoscopic display image is displayed in the state where the object A is viewed so as be wrapped around on the horizontal plane.

The display controller 33 controls the stereoscopic display image selected by the selection unit 32 to be displayed on the display device 10. Namely, the pixel displaying is performed by allowing the pixels constituting the stereoscopic display image to correspond to the display elements of the display surface 10a. In addition, a method of displaying the image on the display device 10 can be implemented by using various existing methods, and the detailed description thereof is not provided.

Next, a pixel array on the display surface 10a of the display device 10 in the stereoscopic image display apparatus 1 will be described.

Figure 14:
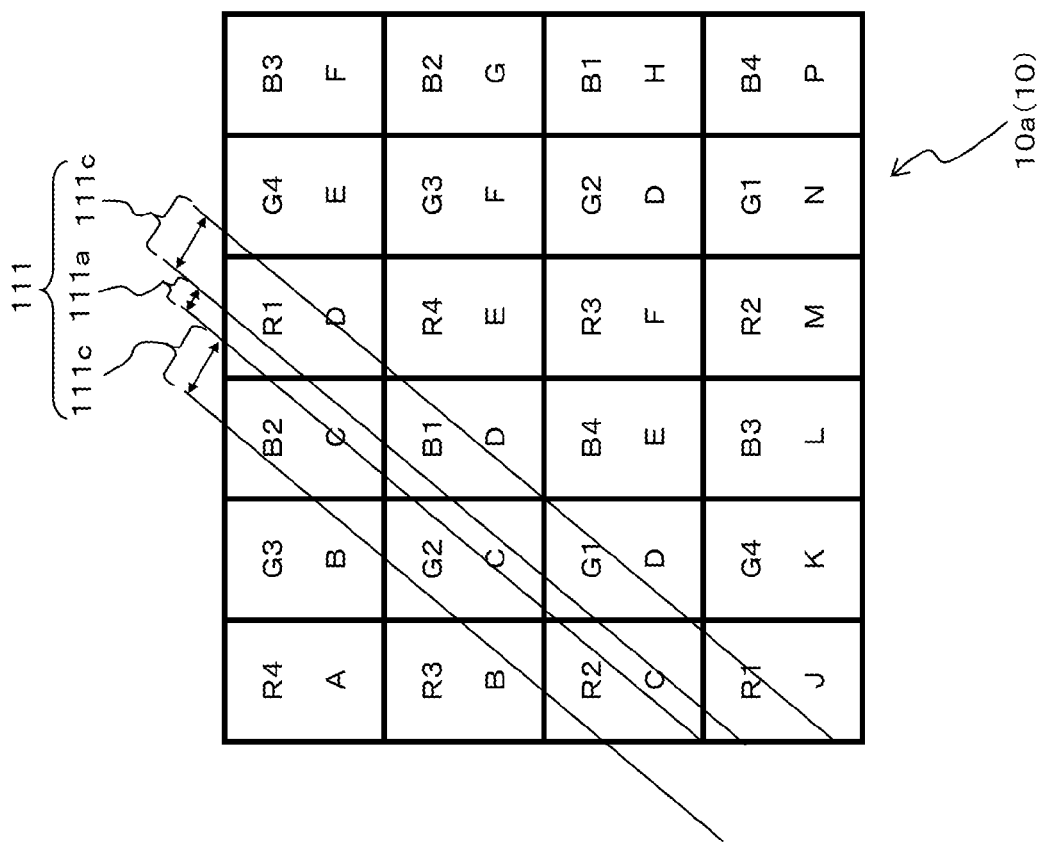
FIG. 14 is a diagram illustrating a relation between a pixel arrangement of a display surface and a lens sheet in the stereoscopic image display apparatus according to the embodiment.

FIG. 14 is a diagram illustrating a relation between the pixel array of the display surface 10a and the lens sheet 11 in the stereoscopic image display apparatus 1 according to the embodiment.

In the example illustrated in FIG. 14, the convex lens 111a and the lens groove portion 111c of the lens sheet 11 are disposed to be inclined with respect to the direction of the pixel array of the display surface 10a. On the display surface 10a of the display device 10, the color pixel elements (display elements) are arranged in the horizontal direction (horizontal direction of FIG. 15; arrangement direction) with respect to the display surface 10a and in the direction (vertical direction of FIG. 14) perpendicular to the horizontal direction. In the example illustrated in FIG. 15, the convex lens 111a and the lens groove portion 111c are disposed in the inclined direction (non-parallel direction) with respect to the vertical direction of the image element arrangement of the display device 10. The direction of the convex lens 111a is disposed to be parallel to the direction of the lens groove portion 111c. Therefore, in the pixels displayed on the display device 10, color pixels are disposed in the inclined direction. In addition, in the example illustrated in FIG. 14, for the convenience, the same color pixels constituting the same pixel are denoted by the same alphabet as an identification reference numeral.

Figure 15:
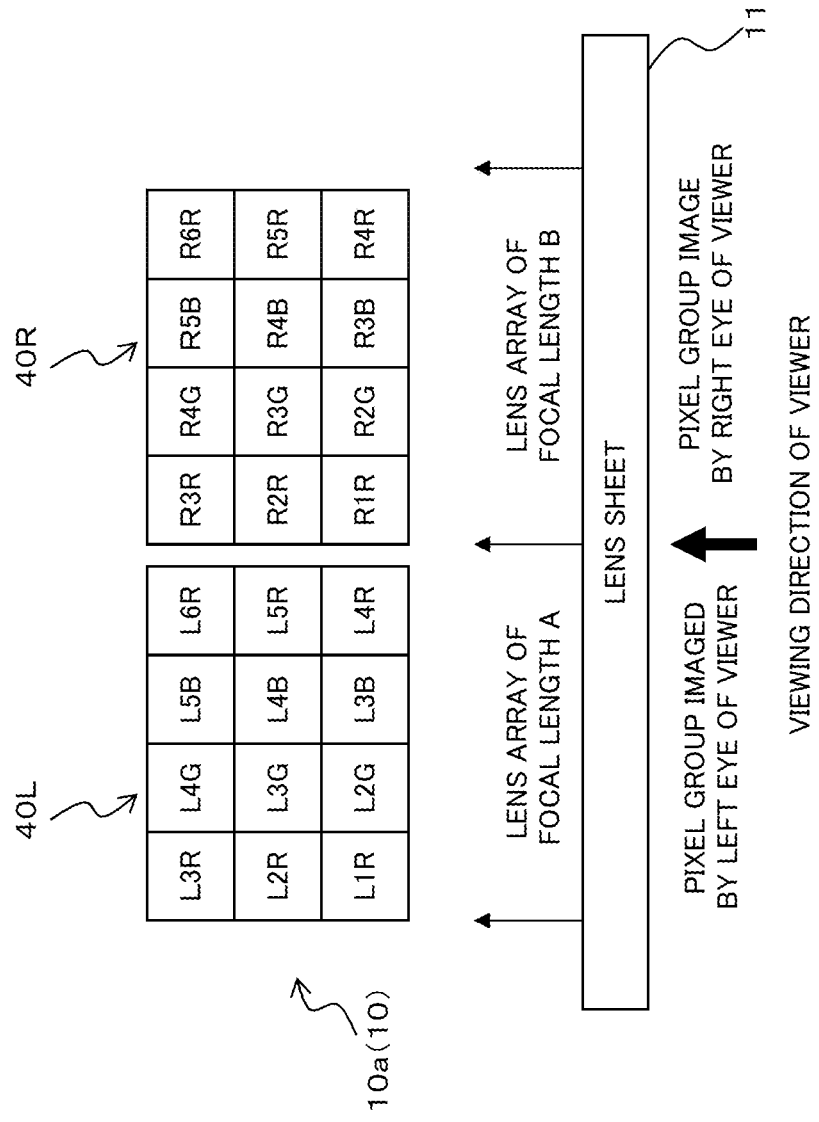
FIG. 15 is a diagram illustrating a relation between a pixel group arrangement and a lens sheet in the stereoscopic image display apparatus.

For example, in the example illustrated in FIG. 15, the color pixels R2_C, G2_C, and B2_C constitute one pixel (pixel C). In addition, the other color pixels have the same configuration. The direction of the color pixels in each pixel is parallel to the direction of each lens portion. In the example illustrated in FIG. 14, one pixel is disposed in the inclined direction.

For example, most of light beams emitted from the pixel C are incident on the same convex lens 111a and focused on the position of any one of the right and left eyes of the user prescribed in advance by the lens. The other pixels have the same configuration. In addition, the pixels of the left-eye image and the pixels of the right-eye image are alternately disposed.

In the example illustrated in FIG. 14, the number of pixels in the horizontal direction is decreased by ¾ times the number of pixels of a two-dimensional image. On the other hand, in the example illustrated in FIG. 15, the number of pixels in the vertical direction is decreased by ⅓ times the number of pixels of a two-dimensional image. In a case where the color pixels R, G, and B of one pixel are disposed in the horizontal direction, the number of pixels in the horizontal direction is decreased by ¼ times the number of pixels of a two-dimensional image. In this case, the number of pixels in the vertical direction is not decreased. As illustrated in FIG. 14, the lenses are disposed in the inclined direction, and one pixel is disposed in the inclined direction, so that it is possible to prevent the resolution from being decreased only in the horizontal direction. In a case where the resolution decreases in the vertical direction and the horizontal direction, the deterioration in image quality is regarded as little in comparison with the case where the resolution decreases only in the horizontal direction.

In addition, for example, if the pixel group illustrated in FIG. 14 is set to a portion of the upper left portion of the display surface 10a of the display device 10, the color pixel R4_A and the color pixels R3_B, G3_B, R1_J, and G4_K are in the state where the color pixels R, G, and B are not included in the same pixel. However, as described below, for example, the display controller 33 performs control of masking the end portion of the display device 10 where the color pixels R, G, and B are not included so as not to be displayed, so that the influence can be prevented.

Next, a relation between the pixel group arrangement and the lens sheet 11 in the stereoscopic image display apparatus 1 will be described with reference to FIG. 15.

As described above, each of the plano convex lenses 111 of the lens sheet 11 has the same configuration and the same focal length with each other. However, a plurality of lens arrays 111 constituting the lens sheet 11 are disposed stepwise, so that the distances of the rear planes 111b of the plano convex lenses 111 from the display surface 10a of the display device 10 are different. Therefore, the focal lengths to the viewer are different.

Next, the left-eye stereoscopic display pixel group 21 and the right-eye stereoscopic display pixel group 22 are displayed on the display surface 10a of the display device 10.

In the example illustrated in FIG. 15, it is assumed that a lens array 111 having a focal length A and a lens array 111 having a focal length B exist in the lens sheet 11. In addition, it is assumed that the focal length A is longer than the focal length B.

Accordingly, for example, the pixels (L3R, L3G, and L3B) represented by the elements L3R, L3G, and L3B in the left-eye stereoscopic display pixel group 21 are focused on the left eye of the viewer through the lens array 111 having a focal length A. Similarly, the pixels (R3R, R3G, and R3B) represented by the elements R3R, R3G, and R3B in the right-eye stereoscopic display pixel group 22 are focused on the right eye of the viewer through the lens array 111 having a focal length B.

Figure 16:
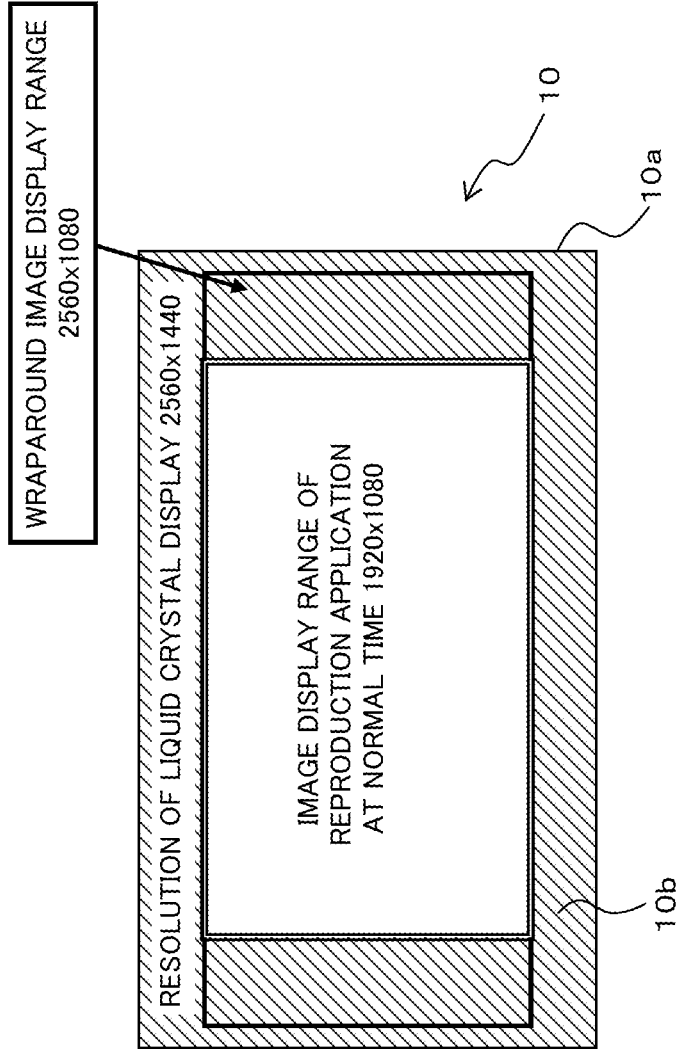
FIG. 16 is a diagram illustrating a relation between a display surface of a display device and a reproduced-image display area in the stereoscopic image display apparatus according to the embodiment.

FIG. 16 is a diagram illustrating a relation between the display surface 10a of the display device 10 and the reproduced-image display area in the stereoscopic image display apparatus 1 according to the embodiment. As described above, it is assumed that the display device 10 is a liquid crystal display having a size of 27 inch or more. The resolution of the liquid crystal display having a size of about 27 inch is, for example, 2560×1440.

Herein, for example, since the resolution of an image recorded on a Blu-ray disk is 1920×1080, the Blu-ray image cannot be displayed on the entire display device 10 even through the reproduction by the reproduction application.

Since the resolution of the display device 10 is larger than the resolution 1920×1080 of the content reproduced by the reproduction application, as illustrated in FIG. 16, an area 10b other than the viewing range where an image is not displayed viewed from the viewer exists in the display surface 10a of the display device 10.

Therefore, in the stereoscopic image display apparatus 1, when the stereoscopic display image is to be displayed on the display surface 10a, the display controller 33 displays the stereoscopic display image by using the area 10b other than the viewing range.

Namely, the data (wraparound image) of the stereoscopic display image of the side portion of the display object is displayed according to the inclined direction by using the image elements of the area 10b other than the viewing range at the side to which the eyes of the viewer are directed according to the rotation angle of the head portion of the viewer. In addition, the extended display using the image elements of the area 10b other than the viewing range is not performed in a state where the viewer is positioned in front of the display surface 10a (rotation angle of 0°; Level 0), but the extended display is performed in a case where the sensing unit 31 senses that the head portion of the viewer is rotated.

Figure 17:
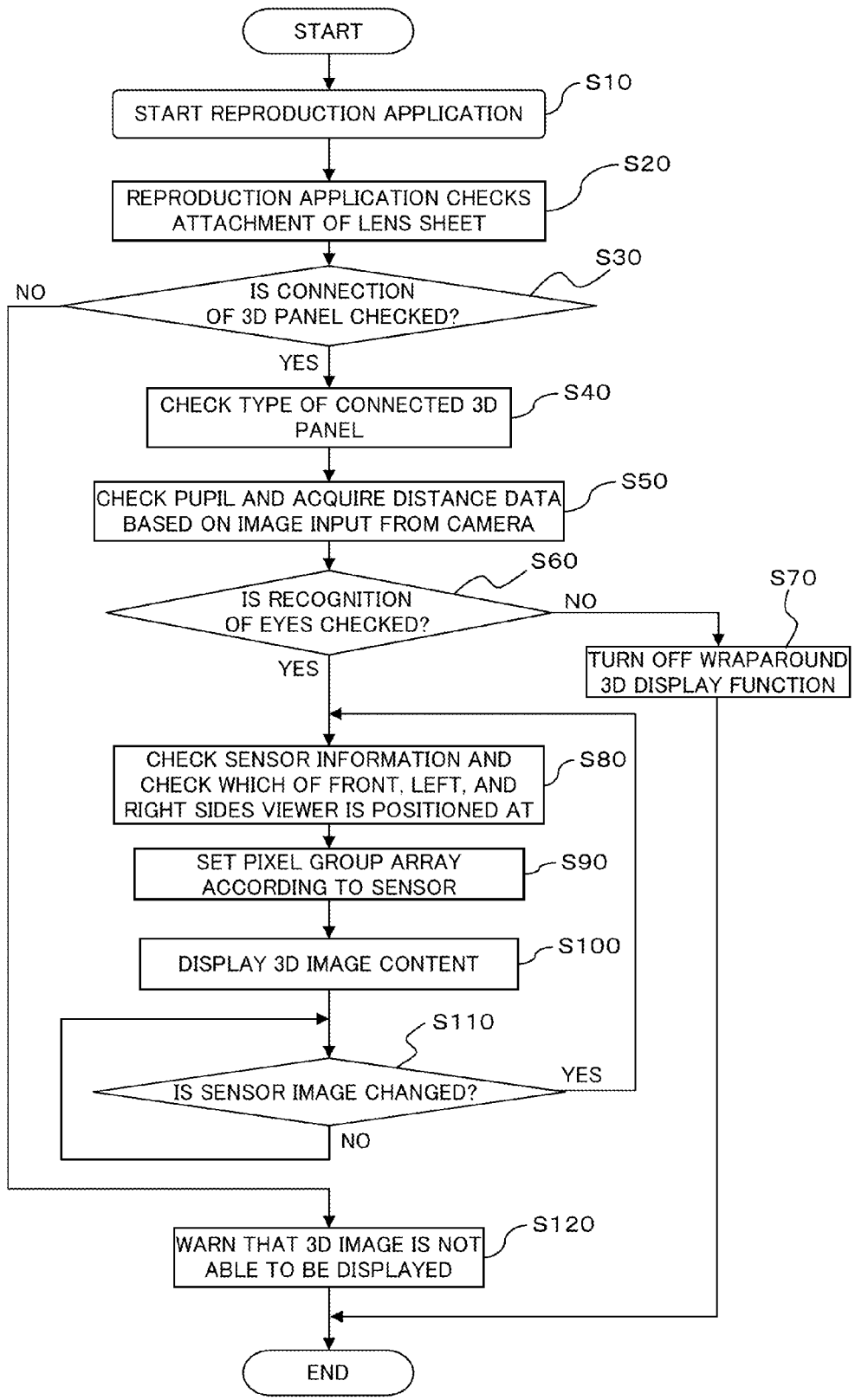
FIG. 17 is a flowchart for describing a method of displaying a stereoscopic display image in the stereoscopic image display apparatus according to the embodiment.

First, a method of displaying a stereoscopic display image in the stereoscopic image display apparatus 1 according to the embodiment having the above-described configuration will be described with reference to a flowchart (Steps S10 to S120) illustrated in FIG. 17. In addition, FIG. 18 is a diagram illustrating a dialog box in the stereoscopic image display apparatus 1 according to the embodiment.

In the stereoscopic image display apparatus 1, if an image reproduction application is started (Step S10), the image reproduction application first checks whether or not the lens sheet 11 (3D sheet) is installed in the display device 10 (Step S20). For example, the image reproduction application determines whether or not the lens sheet 11 is installed based on a result of sensing of the sensor which senses the installation of the lens sheet 11 in the display device 10 (Step S30).

As a result of the determination, in a case where the lens sheet 11 is not installed in the display device 10 (refer to the route of NO in Step S30), a dialog box indicating that the stereoscopic image display cannot be performed is displayed on the display device 10 as illustrated in FIG. 18 (Step S120), and the procedure is ended. In addition, instead of allowing the procedure to be ended after Step S120, the procedure may be returned to Step S20, and appropriate modification may be performed.

In addition, in a case where the lens sheet 11 is installed in the display device 10 (refer to the route of Yes in Step S30), a 3D panel ID of the installed lens sheet 11 is checked, and a type of the lens sheet 11 is identified (Step S40).

The sensing unit 31 acquires data of positions of the two eyes and inter-eye distance based on the face image 300 of the viewer captured by the camera 12 (Step S50).

Herein, it is checked whether or not the acquired inter-eye distance is included in the distance range as predefined reference data in the image reproduction application (Step S60). In a case where the acquired inter-eye distance is not included in the reference data (refer to the route of NO in Step S60), the wraparound 3D display function is turned off (Step S70), and the procedure is ended.

In addition, in a case where the acquired inter-eye distance is included in the distance range as predefined data in the image reproduction application (refer to the route of YES in Step S60), the sensing unit 31 checks which one of the front, left, and right directions the direction of the head portion of the viewer is (Step S80). In addition, in a case where the head portion is rotated, the level is obtained.

The selection unit 32 selects the stereoscopic display image corresponding to the 3D panel ID of the lens sheet 11 and corresponding to the level thereof from the HDD 138 based on the level value obtained by the sensing unit 31 (Step S90). The selection unit 32 reads the selected stereoscopic display image from the HDD 138 and transmits the stereoscopic display image to the display control device 13 so that the stereoscopic display image is displayed on the display device 10 to display the 3D image content (Step S100).

Next, the sensing unit 31 checks whether or not the sensor information is changed (Step S110), and in a case where the sensor information is not changed (refer to the route of NO in Step S110), Step S110 is repeated. In addition, in a case where the sensor information is changed (refer to the route of YES in Step S110), the procedure returns to Step S80. In addition, the checking of the sensor information in Step S110 is repeated and monitored in a predetermined time period.

Figure 19A:
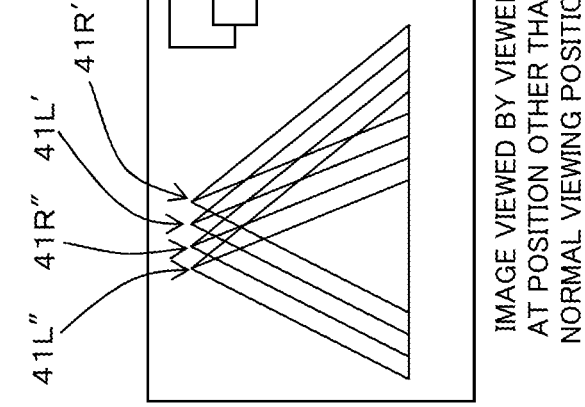
FIGS. 19A and 19B are diagrams illustrating an example where stereoscopic display images according to two different assumed positions of the head portion of the viewer are displayed on a display device in the stereoscopic image display apparatus according to the embodiment.
Figure 19B:
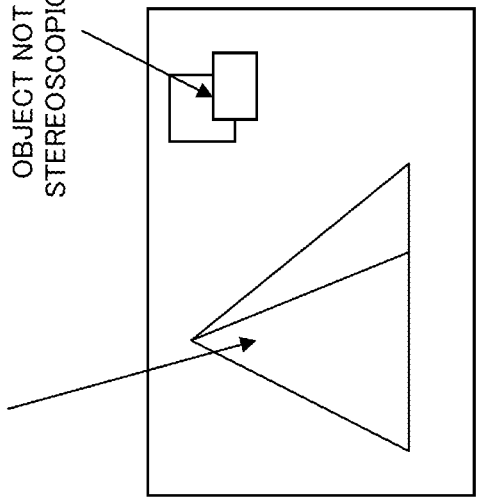

FIGS. 19A and 19B are diagrams illustrating an example where stereoscopic display images assuming two different positions of the head portion of the viewer are displayed on the display device 10 in the stereoscopic image display apparatus 1 according to the embodiment. FIG. 19A illustrate a state where the display device 10 is viewed from the one of the two assumed positions of the head portions, and FIG. 19B is a state where the display device 10 is viewed from a position other than any one of the two assumed positions of the head portion.

FIG. 19B illustrates the right-eye stereoscopic display image 41R' and the left-eye stereoscopic display image 41L' for focusing on the first assumed position of the head portion of the viewer and the right-eye stereoscopic display image 41R" and the left-eye stereoscopic display image 41L" for focusing on the second assumed position of the head portion of the viewer.

If the display device 10 is viewed from a normal viewing position, that is, the first assumed position of the head portion or the second assumed position of the head portion, as illustrated in FIG. 19A, any one of the stereoscopic display images corresponding to the viewing position is correctly focused on the eyes of the viewer.

In addition, if the display device 10 is viewed from a position other than a normal viewing position, that is, a position other than any one of the first assumed position of the head portion and the second assumed position of the head portion, as illustrated in FIG. 19B, any one of the left-eye stereoscopic display images 41L' and 41L" and the right-eye stereoscopic display images 41R' and 41R" are not focused, so that four-folded images are displayed. In addition, as illustrated in FIG. 19B, an object which does not relate to a stereoscopic display image is not displayed in a four-folded manner.

Figure 20:
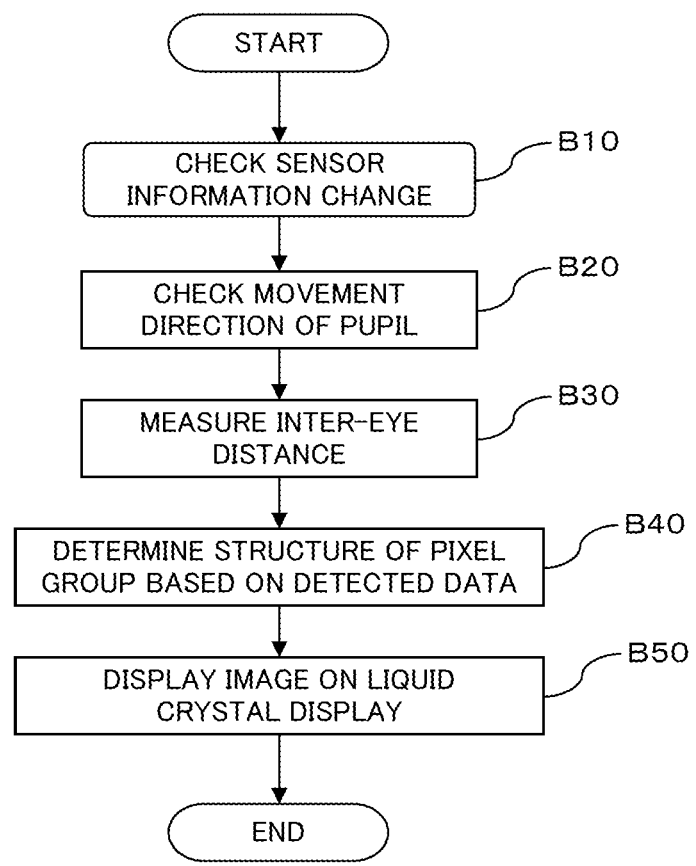
FIG. 20 is a flowchart describing a correction method of focusing a display device on which a stereoscopic display image is displayed in a four-folded manner as a normal stereoscopic display image.

As illustrated in FIG. 19B, a correction method of focusing the display device 10 on which the stereoscopic display image is displayed in a four-folded manner as a normal stereoscopic display image will be described with reference to a flowchart illustrated in FIG. 20 (Steps B10 to B50).

First, the viewer is positioned in front of the display device 10 to allow the face to be directed to an arbitrary direction. Accordingly, the distances from the display device 10 and the lens sheet 11 to the eyes of the viewer are changed. Therefore, as illustrated in FIG. 19B, the focal length of the to-be-stereoscopically-imaged object having parallax information in the rotation direction is not a regulated value, so that the image is viewed as a four-folded image.

Herein, the position information of the two eyes of the viewer is captured by the camera 12 and is determined by the sensing unit 31.

Namely, the change in the sensor information is checked (Step B10), and the sensing unit 31 checks the movement direction of the two eyes of the viewer (Step B20). In addition, the inter-eye distance is measured (Step B30).

The sensing unit 31 represents the rotation amount of the head portion of the viewer as a level value based on the measured inter-eye distance, and the selection unit 32 selects the stereoscopic display image (left-eye stereoscopic display image and right-eye stereoscopic display image) according to the level value (Step B40).

Next, the display controller 33 displays the stereoscopic display image selected by the selection unit 32 on the display device 10 (Step B50).

Therefore, the stereoscopic display image corresponding to the new position of the viewer is displayed and focused on the display device 10 by using the plano convex lens 111 corresponding to the new position of the viewer, so that the viewer can view the stereoscopic display image as illustrated in FIG. 19A.

Figure 21:
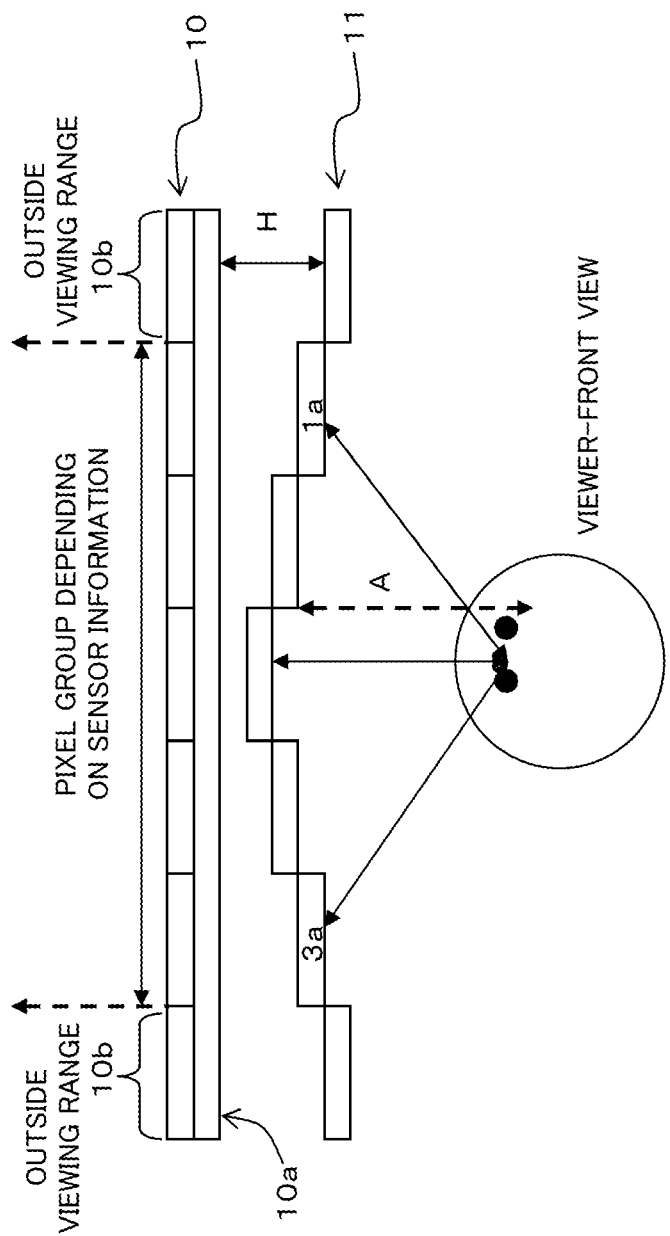
FIG. 21 is a schematic diagram illustrating a relation among the display device, the lens sheet, and the viewer in the stereoscopic image display apparatus according to the embodiment.
Figure 22:
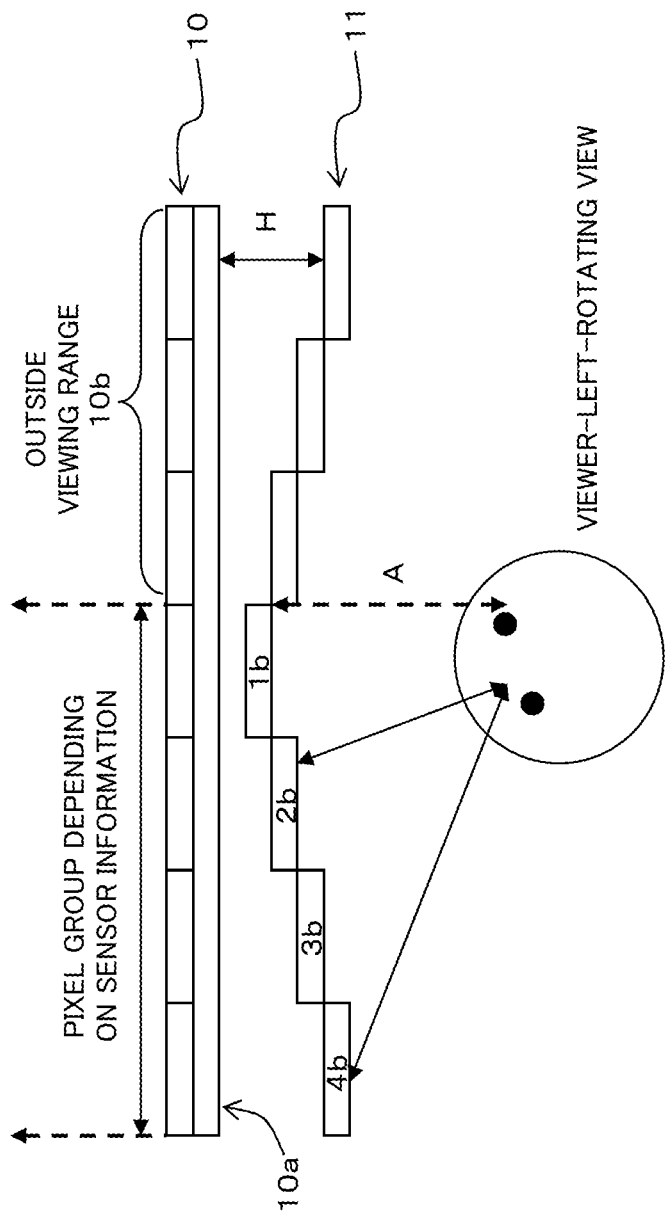
FIG. 22 is a schematic diagram illustrating a relation among the display device, the lens sheet, and the viewer in the stereoscopic image display apparatus according to the embodiment.

FIGS. 21 and 22 are diagrams illustrating relations among the display device 10, the lens sheet 11, and the viewer in the stereoscopic image display apparatus 1 according to the embodiment. A process of allowing the lens array which focuses on the viewer to be changed in the stereoscopic image display apparatus 1 will be described with reference to FIGS. 21 and 22.

In addition, in FIGS. 21 and 22, the display device 10 and the lens sheet 11 are simplified in illustration.

As illustrated in FIG. 21, the viewer is positioned so as to face the display device 10 where the lens sheet 11 is installed on the display surface 10a, and the stereoscopic display image to be displayed on the display device 10 is focused on the two eyes of the viewer, so that the viewer can view the stereoscopic image.

The lens sheet 11 is configured to have a curved structure where the distance to the display surface 10a of the display device 10 is changed stepwise by arranging a plurality of the plano convex lenses 111 in an arch shape so as to be parallel to each other.

The position of the viewer is, for example, a seating position where the viewer can manipulate the keyboard 144 or the mouse 145, and is also a recommended position so that the distance between the two eyes of the viewer and the display surface 10a becomes a predefined recommended viewing distance.

In FIGS. 21 and 22, H is a distance from the pixel group on the display surface 10a to the rear plane 111b of the plano convex lens 111 of the lens sheet 11 on which the pixel group is focused. In addition, A is a distance from the front position of the display device 10 to the viewer, and it is assumed that the distance A is not changed.

In the state illustrated in FIG. 21, the viewer focuses/views a 3D image through combination of the plano convex lenses 111 (1a, 3a). Namely, the pixel of the right-eye stereoscopic display image of the plano convex lens 111 denoted by reference numeral 1a is focused on the right eye of the viewer, and the pixel of the left-eye stereoscopic display image of the plano convex lens 111 denoted by reference numeral 3a is focused on the left eye of the viewer, so that the viewer recognizes the stereoscopic display image.

Next, as illustrated in FIG. 22, the viewer rotates the head portion about the neck as an axis in the left direction. In the state illustrated in FIG. 22, first, the viewer focuses/views a 3D image through combination of the plano convex lenses 111 (1b, 3b), and when the viewer rotates the head portion in the left direction, the viewer focuses/views a 3D image through combination of the plano convex lenses 111 (2b, 4b).

Herein, the distance between the plano convex lens 111 denoted by reference numeral 2b and the right eye of the viewer is different from the distance between the plano convex lens 111 denoted by reference numeral 4b and the left eye of the viewer.

However, since the lens sheet 11 has a curved structure so that the distance H to the display device 10 is different according to the plano convex lens 111, the viewer can align the focal lengths with the right and left eyes.

In the stereoscopic image display apparatus 1, it is determined, by the camera 12 and the sensing unit 31, whether or not the imaging distances of the eyes of the viewer are changed. The selection unit 32 acquires the stereoscopic display image according to the angle of the head portion of the viewer from the HDD 138 and displays the stereoscopic display image on the display surface 10a, so that the newly displayed stereoscopic display image is focused on the eyes of the viewer after the movement.

Namely, the pixel of the right-eye stereoscopic display image of the plano convex lens 111 denoted by reference numeral 2b is focused on the right eye of the viewer, and the pixel of the left-eye stereoscopic display image of the plano convex lens 111 denoted by reference numeral 4b is focused on the left eye of the viewer, so that the viewer can recognizes the stereoscopic display image in the state where the head portion is rotated.

According to the operation of the rotation of the head portion of the viewer, regarding the image focused on the viewer, for example, the stereoscopic image data 41a is replaced by the stereoscopic image data 41b, and further replaced by the stereoscopic image data 41c as illustrated in FIG. 13, so that the wraparound 3D display function can be implemented.

In addition, the pixel group of the pixel array is displayed on the display surface 10a in accordance with the posture of the head portion of the viewer, that is, the positions of the two eyes, so that the stereoscopic image providing a feeling of depth or a feeling of protrusion can be focused on the eyes of the viewer.

In addition, in the example illustrated in FIG. 22, the pixel group of the stereoscopic display image is displayed on the left side portion which becomes the area 10b other than the viewing range in the state illustrated in FIG. 21, so that the stereoscopic display image can be viewed by the viewer who rotates the head portion leftwards.

In addition, for example, in FIG. 22, in the state where the viewer focuses/views a 3D image through combination of the plano convex lenses 111 (2b, 4b), although pixels groups are displayed on the plano convex lenses 111 other than the plano convex lenses 111 (2b, 4b), the viewer cannot focus a 3D image. However, if the distances from the plano convex lenses 111 and the two eyes of the viewer are coincident, the viewer can focus a 3D image.

Therefore, in the state illustrated in FIG. 22, the next state (level) of the position of the head portion of the viewer may be estimated, and the stereoscopic display image of the display object corresponding to the estimated level may be acquired. The acquired stereoscopic display image may be displayed with respect to the estimated plano convex lens 111.

Next, a relation between the shape of the lens sheet 11 and the position of the head of the viewer will be described. In addition, hereinafter, the example where the viewer rotates the head leftwards will be described.

Figure 23A:
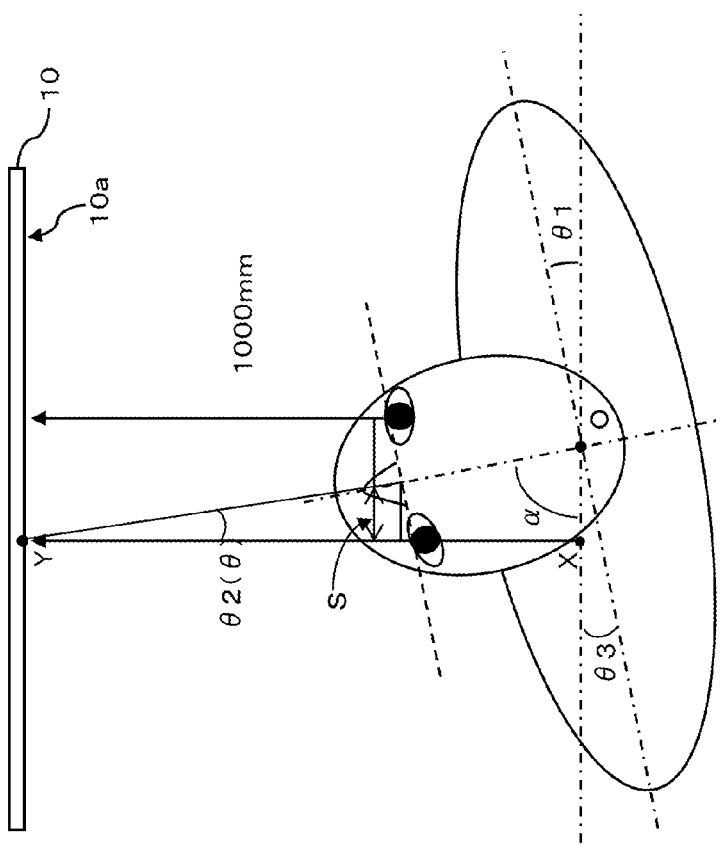
FIGS. 23A and 23B are diagrams illustrating a positional relation between a posture and eyes of the viewer and the display device.
Figure 23B:
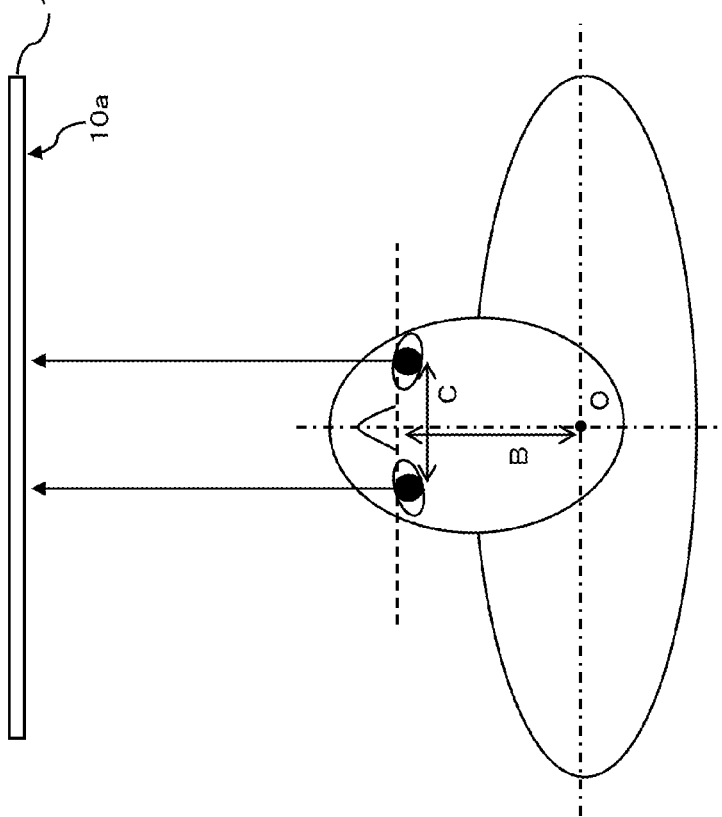

FIGS. 23A and 23B are diagrams illustrating a positional relation between a posture and eyes of the viewer, and the display device 10. FIG. 23A is a plan diagram illustrating the state where the viewer is positioned in front of the display device 10, and FIG. 23B is a plan diagram illustrating the state where the viewer rotates the head leftwards from the state illustrated in FIG. 23A.

FIGS. 24A, 24B, and 24C are diagrams illustrating positions of the two eyes and image distances changed according to movement of the head of the viewer. FIG. 24A is a diagram illustrating the state where the viewer is positioned in front of the display device 10, FIG. 24B is a diagram illustrating the state where the viewer rotates the head by a first angle leftwards, and FIG. 24C is a diagram illustrating the state where the viewer rotates the head by a second angle leftwards. In addition, in FIGS. 24A, 24B, and 24C, the lens sheet 11 is not illustrated.

For example, the inter-eye distance C of a person is assumed to be 70 mm (C=70 mm), and when the viewer is to rotates the head, the viewer is assumed to horizontally rotate the two shoulders about the spine as an axis. This is because, in a case where a person is to rotate the head toward any one (for example, left side) of the right and left sides, it is difficult to rotate the head without causing a change in the distance from the eye (for example, left eye) at the side of the rotation direction to the display device 10 in terms of human body engineering. Therefore, hereinafter, as illustrated in FIGS. 23A and 23B, it is assumed that the viewer rotates the head about the center (assumed as a spine) of the line connecting the two shoulders as a central axis O.

Herein, as illustrated in FIGS. 23A and 23B, the distance B from the central position between the two eyes to the central axis is assumed to be 150 mm (B=150 mm), and the rotation angle (hereinafter, sometimes, referred to as a rotated head angle or simply an angle) of the head (body) rotated with respect to the direction parallel to the display surface 10a of the display device 10 is denoted by $\theta$.

For example, cases where the angle $\theta$ is 0°, 20°, and 40° will be described.

In the case of $\theta=0°$, as illustrated in FIG. 23A, since the viewer is positioned in front of the display device 10, the right and left eyes have the same distance with respect to the display device 10.

In the case of $\theta=20°$, as illustrated in FIG. 23B, since the head is rotated by 20° leftwards with respect to the display device 10, the position of the left eye is separated from the display device 10 by C×tan 20 in comparison with the position of the right eye.

$$C \times \tan 20 = 70\ mm \times \tan 20 \approx 25$$

Namely, the left eye is separated from the display device 10 by 25 mm plus compared to the separation distance of the right eye.

In addition, since the head is rotated about the central axis O, the positions of the two eyes are separated from the display device 10 by B−B×cos 20.

Namely, B−B×cos 20=150−150 cos 20≈10 mm is added.

Therefore, as illustrated in FIG. 24B, when the viewer rotates the head by 20° leftwards (XX=20), the distance J3 between the display surface 10a and the right eye is J3=1000+10=1010, and the distance J3 between the display surface 10a and the left eye is J3=1000+10+25=1035.

Similarly, in the case of $\theta=40°$, the position of the left eye is separated from the display device 10 by C×tan 40 with respect to the position of the right eye.

$$C \times \tan 40 = 70\ mm \times \tan 40 \approx 35$$

Namely, the left eye is separated from the display device 10 by 35 mm plus compared to the separation distance of the right eye.

In addition, since the head is rotated about the central axis O, the positions of the two eyes are separated from the display device 10 by B−B×cos 40.

Namely, B−B×cos 40=150−150 cos 40≈35 mm is added.

The distance XY between the left eye (right eye) and the display surface 10a of the display device 10 can be expressed by the following Equation (2) based on the aforementioned variables $\theta$, B, and C and the imaging distance J at the front position of the viewer.

$$XY = J + E(C \times \tan \theta) + (J - C \times \cos \theta) \tag{2}$$

Herein, E: $\epsilon \{0, 1\}$, and for example, 0 denotes the right, and 1 denotes the left.

In addition, it is assumed that $\theta \neq 0$.

The distances from the display device 10 to the eyes can be expressed by using the rotation angle $\theta$ of the head portion of the viewer through Equation (2).

In addition, the distance from the lens sheet 11 to the two eyes of the viewer is denoted by D, the distance between the pixel of the display surface 10a of the display device 10 and the lens sheet 11 is denoted by G, and the thickness of the lens in the plano convex lens 111 is denoted by h. In this case, the following Equation (3) is satisfied.

$$1/R1 = 1/D + 1/(G+h) \tag{3}$$

In addition, details of Equation (3) will be described below.

The following Equation (4) can be obtained from the above Equation (3).

$$1/R1 = 1/XY + 1/(G+h) \tag{4}$$

In addition, R1 is a radius of curvature of the plano convex lens 111 and has a fixed value. In addition, h is a thickness of the plano convex lens 111 and has a fixed value.

The pixel-lens distance G can be expressed by using the rotation angle $\theta$ of the head portion of the viewer from the above-described two Equations (2) and (4). Therefore, since the setting of G according to the rotation angle is defining of the curved structure where the lens sheet is receded stepwise by the G, the setting of G corresponds to an algorithm capable of defining by the rotation angle.

For example, it is assumed that the display device 10 is a liquid crystal display having a resolution of 1920×1020 pixels. At the center of the display surface 10a of the display device 10, the pixel and the lens array 111 are disposed to be separated from each other by 4.025 mm.

In this configuration, the state where the head portion of the viewer is rotated by 20° leftwards is exemplified.

In the example illustrated in FIG. 23B, it is assumed that θ1=θ2. In a triangle formed by the point O, the point X, and the point Y, since α+θ3=90°, it is satisfied that θ1=θ3.

Next, when the viewer rotates the head by θ2 leftwards, the viewer views the position of the display surface 10a separated by S=1000 mm×tan θ2 leftwards by using the right eye of the viewer. For example, when the viewer rotates the head by 20° leftwards, the viewer views the position of the display surface 10a separated by S=1000 mm×tan(20°)=364 mm leftwards by using the right eye of the viewer.

Herein, in the liquid crystal display having a resolution of 1920×1020, it is assumed that the size of one pixel in the horizontal direction is 0.412 mm and one pixel includes three types of color pixels R, G, and B.

If the left half surface of the display device 10 is considered, there are (1920/2)×3=2880 pixels in the horizontal direction. Therefore, the dimension in the horizontal direction becomes 2880×0.412=1192 mm.

1192/364≈3.3, and when the viewer rotates the head by 40° leftwards, the viewer views the center of the three-divided (40°, 60°, 80°) screen through the right eye in the left half surface of the display surface 10a of the display device 10.

In addition, if the head portion of the viewer is further rotated, the focal length is receded from the display device 10 with respect to the right eye, and thus, in the range of the lens array where the focal length is aligned with the left eye when θ=20°, the focal length is aligned with the right eye.

For example, a stereoscopic image display apparatus 1 where the viewer views different images when the viewer rotates the head by 20° is considered. The viewer which is positioned to face the front side of the display device 10 (angle=0°) sequentially rotates the head by 20°, 40°, 60°, and 80° leftwards. In this case, the imaging distance of the left eye is set to 1 m at the rotated head angle of 0°, Bm at the rotated head angle of 20°, Cm at the rotated head angle of 40°, Dm at the rotated head angle of 60°, and Em at the rotated head angle of 80°. In this case, the imaging distance of the right eye becomes 1 m at the rotated head angle of 0°, Am at the rotated head angle of 20°, Bm at the rotated head angle of 40°, Cm at the rotated head angle of 60°, and Dm at the rotated head angle of 80°.

Next, the switching of the eye which is aligned with the focal length is repeated according to the rotation of the head portion. Accordingly, a lens sheet structure where the right and left eyes are sequentially aligned with the focal length can be provided.

In addition, in the state illustrated in FIG. 24A, the right and left eyes have the same distance (imaging distance) J1 with respect to the display device 10.

When the viewer rotates the head portion leftwards to be a first angle (θ=XX°), as illustrated in FIG. 24B, the right and left eyes have different imaging distances (right eye: J2 and left eye: J3). In addition, since the right eye is further separated from the display device 10 according to the rotation of the head portion, any of the imaging distances is different from the focal length J1 in the state illustrated in FIG. 24A.

In addition, when the viewer rotates the head portion leftwards to be a second angle (θ=YY°), as illustrated in FIG. 24C, the imaging distance of the left eye becomes J4, and the imaging distance of the right eye is aligned with the imaging distance J3 of the left eye in the state illustrated in FIG. 24B. Since the rotation of the head portion is sensed by the camera 12, the wraparound-image reproduction application performs pixel group arrangement according to the rotation. Namely, the stereoscopic display image is displayed according to the rotation amount of the head portion of the viewer.

FIG. 25 is a diagram illustrating a relation between angles of the right and left eyes and positions used for focusing by the two eyes in the lens sheet 11 in the stereoscopic image display apparatus 1 according to the embodiment.

In addition, in the example illustrated in FIG. 25, for the convenience, a left half of the display device 10 is illustrated, and the leftward rotation of the head portion of the viewer is exemplified. In the stereoscopic image display apparatus 1, as described above, the imaging distance of the lens array 111 is changed according to the rotation of the head portion of the viewer, and the pixel group arrangements of the right-eye and left-eye image data are changed according to the rotation of the head portion. Therefore, the viewer can view the rotation image without unpleasant feeling.

For example, an area α1 of the lens sheet 11 used for focusing on the left eye in the state where the viewer is positioned in front of the display device 10 (angle 0°) is further used for focusing on the right eye in the state where the viewer rotates the head portion to be an angle XX°.

In addition, an area α2 of the lens sheet 11 used for focusing on the left eye in the state of the angle XX° is further used for focusing on the right eye in the state where the viewer rotates the head portion to be an angle XXX°.

Figure 26:
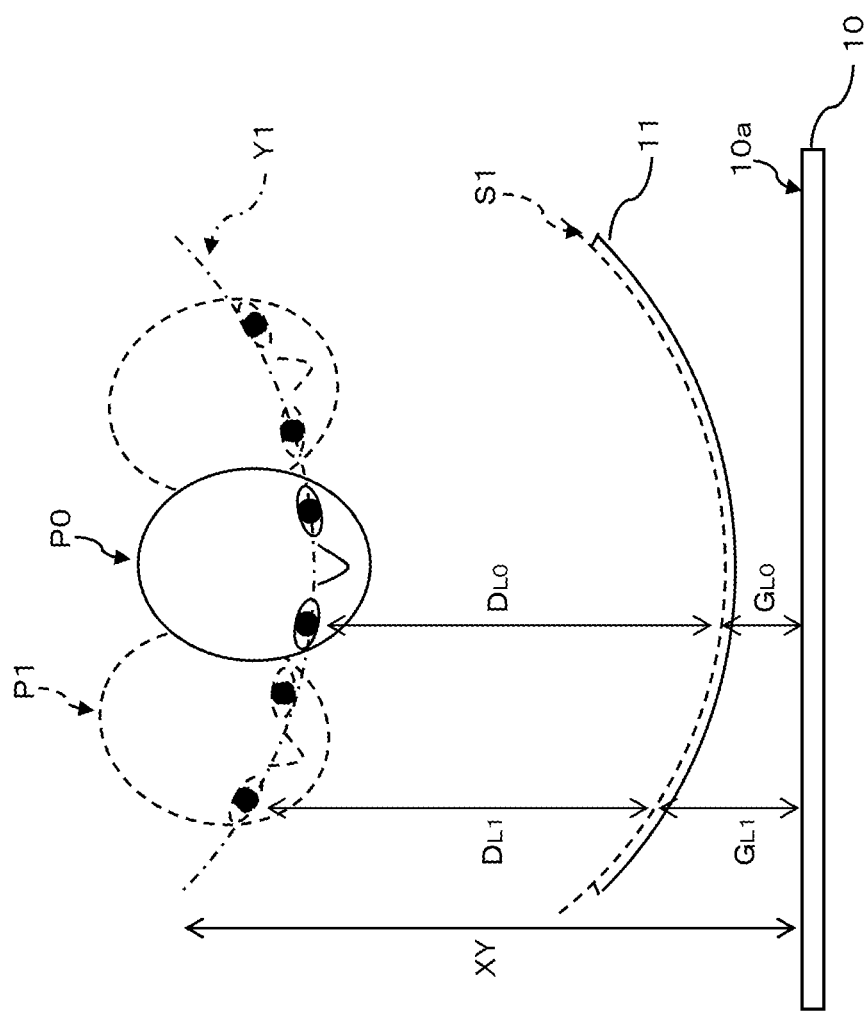
FIG. 26 is a plan diagram illustrating a lens sheet in the stereoscopic image display apparatus according to the embodiment.

FIG. 26 is a plan diagram illustrating the lens sheet 11 in the stereoscopic image display apparatus 1 according to the embodiment. As described above, the lens sheet 11 has a curved structure so that the distances of a plurality of the lens arrays 111 from the display surface 10a of the display device 10 is increased as it goes to each of the right and left end portions.

As the lens sheet 11 is viewed from the upper side, as illustrated in FIG. 26, the shape S1 of the curved surface is the same as or almost the same as the shape of the trajectory Y1 along which the two eyes pass when the viewer rotates the neck in the stereoscopic image display apparatus 1.

Therefore, for example, in the example illustrated in FIG. 26, the distance $D_{L0}$ between the right eye and the lens sheet 11 in the state where the viewer is positioned in front of the display device 10 (rotation angle of 0; Level 0) (refer to the position P0) is equal to the distance $D_{L1}$ between the right eye and the lens sheet 11 in the state where the viewer rotates the head by a predetermined angle rightwards (refer to the position P1).

Therefore, the distance G between the display device 10 and the lens sheet 11, that is, the distance between the display surface 10a and the plano convex lens 111 is adjusted based on the above-described Equations (2) and (4) so that the focal length is aligned with the points on the trajectory Y1. Accordingly, the lens sheet 11 of the stereoscopic image display apparatus 1 can be implemented.

Next, as a reference, a flat lens sheet is configured without a curve in the plano convex lenses 111 and is disposed on the display surface 10a of the display device 10. In this case, similarly to FIG. 19B, the case where a stereoscopic display image according to two different assumed positions of the head portion of the viewer is displayed will be described.

Figure 27:
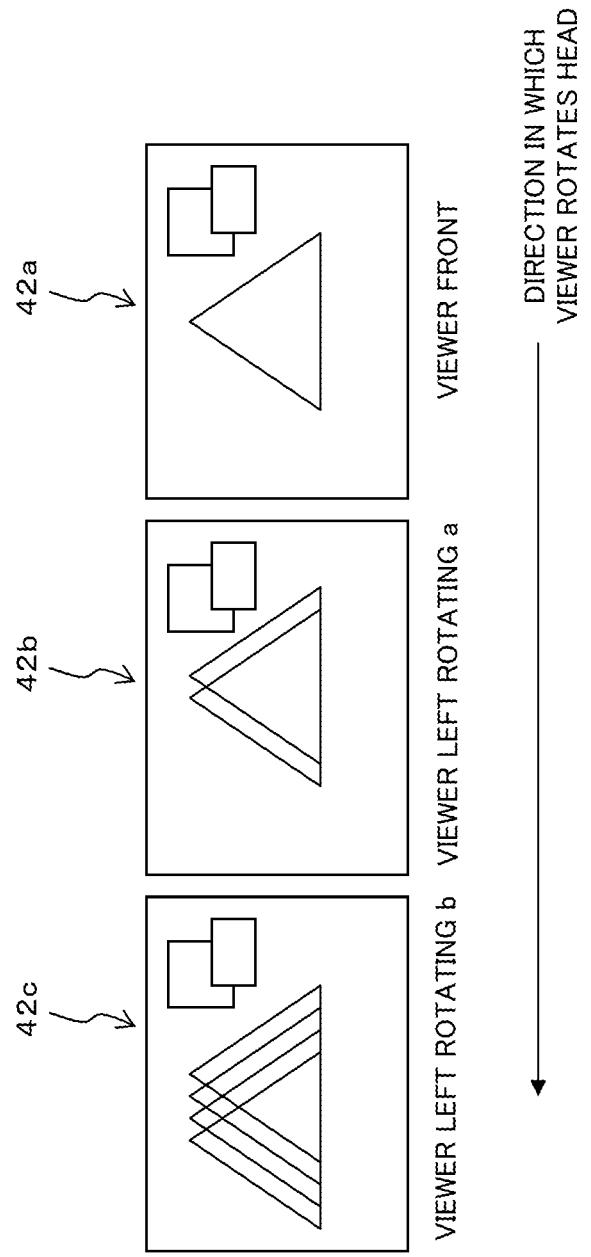
FIG. 27 is a diagram illustrating an example where a stereoscopic display image according to two different assumed positions of the head portion of the viewer is displayed on the display device having a flat lens sheet.

FIG. 27 is a diagram illustrating an example where a stereoscopic display image according to two different assumed positions of the head portion of the viewer is displayed on the display device having a flat lens sheet.

In the state where the viewer is positioned in the front side (rotation angle 0°), the stereoscopic image data 42a is displayed. In this state, if the viewer rotates the head portion of the viewer leftwards, since the lens sheet is not curved, first, the distance between the left eye of the viewer and the liquid crystal display is increased. Therefore, similarly to the stereoscopic image data 42b, the focusing on the left eye is not obtained, so that the image is viewed in a two-folded manner.

In this state, if the viewer further rotates the head portion of the viewer, the right eye is further separated from the liquid crystal display according to the rotation of the head portion. As a result, similarly to the stereoscopic image data 42c, the image is viewed at the right eye in a two-folded manner, so that the display image is viewed in a four-folded manner.

In this manner, according to the stereoscopic image display apparatus 1 according to the embodiment, if the viewer in front of the display device 10 rotates the head portion about the neck as an axis, the sensing unit 31 recognizes the positions of the two eyes and senses the rotation amount of the head portion of the viewer based on the face image 300 of the viewer captured by the camera 12.

Next, the selection unit 32 selects the stereoscopic display image from the HDD 138 according to the movement amount of the head portion and displays the stereoscopic display image on the display screen, so that the stereoscopic display image can be focused on the eyes of the viewer.

Namely, even in the case where the viewer in front of the display device 10 rotates the head portion so that the distance between the display device 10 and the eyes of the viewer is changed, the stereoscopic display image can be focused on the eyes of the viewer. Accordingly, a wraparound 3D display function is implemented, so that a circular stereoscopic viewing image effect can be obtained.

The configuration where a wraparound image is recognized by rotating the head at the position without a change in the position of the viewer is available.

In addition, when the wraparound 3D display function is to be implemented, the wraparound 3D display function can be implemented by the camera 12 capturing the face image 300 of the viewer. Therefore, an optical unit/system having a configuration including a highly-expensive light beam control unit is not needed, so that the production cost can be reduced.

Namely, other images can be implemented with accurate focal length by the position where the viewer views a 3D image in real-time and at low cost.

Figure 28:
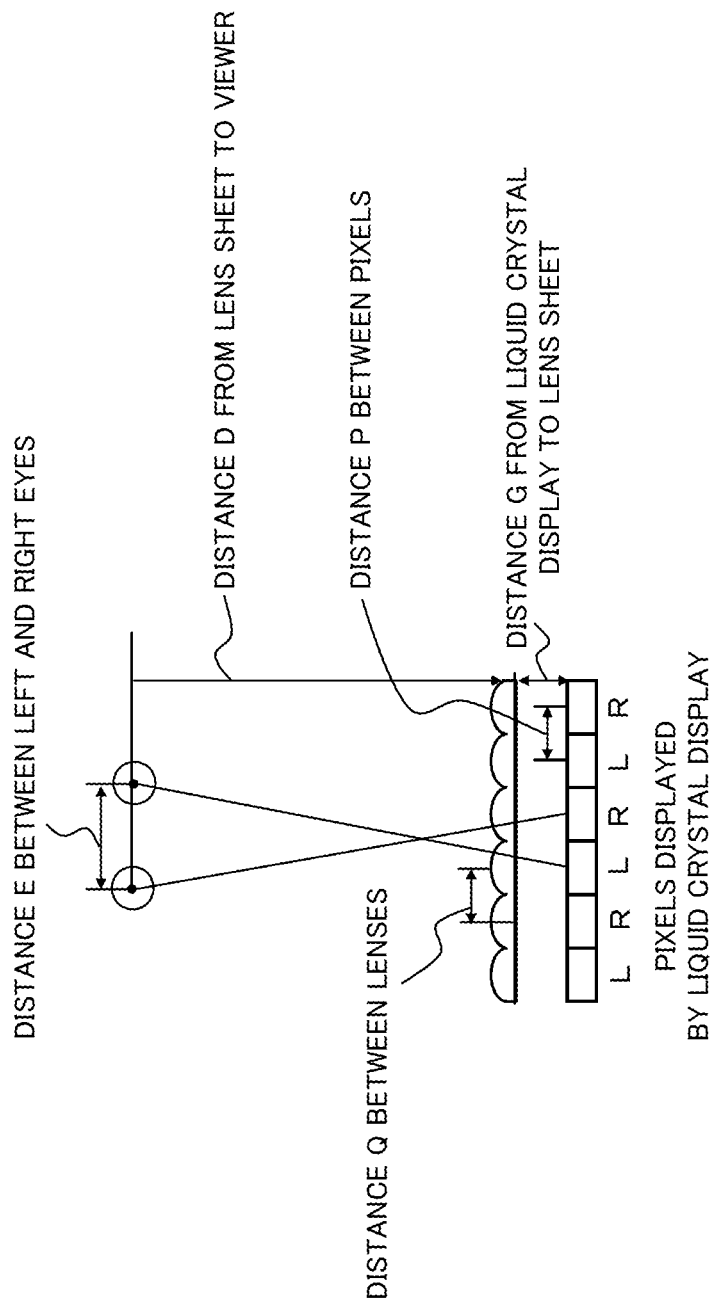
FIG. 28 is a diagram illustrating a relation among a display device, a lens sheet, and positions of two eyes of a viewer.

FIG. 28 is a diagram illustrating a relation among the display device, the lens sheet, and the positions of the two eyes of the viewer. For the convenience, an example including a flat lens sheet is exemplified.

According to a generalized lens' law, as illustrated in FIG. 28, the inter-eye distance of the viewer is denoted by E, the inter-pixel distance of the display device 10 is denoted by P, the distance from the lens sheet 11 to the two eyes of the viewer is denoted by D, and the distance (pixel-lens distance) from the display surface 10a to the lens sheet 11 is denoted by G. In addition, the distance between the vertexes of the adjacent plano convex lenses 111 of the lens sheet 11 is denoted by Q. In this case, the following Equations are satisfied.

$$E:P=D:G$$

$$2PD=Q(D+G)$$

$$1/D+1/G=1/f$$

Therefore, the focal length f where the lens sheet 11 focuses the 3D image is a fixed value like the Q value or the P value because of the low cost configuration using the existing display device 10 although the P value or the f value of the existing liquid crystal display used for two-dimensional display in a PC is changed.

When the distance G is changed, the difference in focal length is illustrated in FIG. 28. In addition, in the example, a thickness h of the plano convex lens 111 is added to the value of the distance G from the display surface 10a to the lens sheet 11. Namely, G=G+h.

In addition, the following Equation is satisfied.

$$1/f=(n-1)/R1$$

Similarly, if it is assumed that n=2, the above-described Equation (3) is satisfied. Namely, the following Equation is satisfied.

$$1/R1=1/D+1/(G+h) \tag{3}$$

Herein, the thickness h of the plano convex lens 111 is a fixed value, and if the value is set to 1 mm, similarly, and if a plurality of focal lengths of a first focal length A, a focal length of (A+0.05 m) and a focal length of (A+2(0.05 m)) in the same width of 0.418 and a ratio of curvature R1 of the lens are not changed, the relation can be obtained by using G, wherein the image distance to the viewer is denoted by D.

For example, if h=1 mm and R1=about 5 mm, the focal length (imaging distance) D can be set to 1000 mm at G=3.016 mm. The imaging distances by using G as a variable in the same manner are listed in FIG. 29.

As illustrated in FIG. 29, by changing the value having three digits after the decimal point of the distance G between the pixel (display surface 10a) and the lens sheet 11, the value of the imaging distance (focal length) D can be changed.

For example, in the display device 10 having a screen size of 23 inch and a resolution of 1920×1080 (pixels), the pixel pitch is designed to be 0.418 mm. Therefore, since the accuracy of the pixel-lens distance G illustrated in FIG. 29 is allowable, it can be understood that the method of controlling the imaging distance by using the pixel-lens distance G according to the present invention can be implemented.

Namely, since the lens sheet 11 having a curved structure is installed on the display surface 10a of the display device 10, the method of using different focal lengths according to the positions of the display surface 10a can be easily implemented, and thus, the method can be easily applied to an existing display device of a computer.

Next, a method of forming the lens sheet 11 in the stereoscopic image display apparatus 1 will be described. As described above, the lens sheet 11 is configured by arranging a plurality of the plano convex lens 111 in the horizontal direction (refer to FIG. 3).

In addition, with respect to each plano convex lens 111, it is assumed that the lens sheet 11 is configured with n plano convex lenses 111. In addition, it is assumed that the viewer in front of the display device 10 views the stereoscopic image display apparatus 1 at the position separated by, for example, 1.00 m from the display surface 10a.

First, with respect to the (n/2)-th plano convex lens 111 disposed at the center of the lens sheet 11 in the horizontal direction, the distance between the pixel on the flat display surface 10a and the plano convex lens 111 is 4.025 mm. Therefore, as illustrated in FIG. 4, when the lens sheet 11 is to be installed on the display device 10, the (n/2)-th plano convex lens 111 from the corner is positioned so as be disposed at the position separated by 4.025 mm from the display surface 10a of the display device 10.

In the lens sheet 11, the distance of each of the plano convex lenses 111 constituting the lens sheet 11 from the display device 10 is determined based on the above-described Equations (2) and (4). In addition, in the lens sheet 11, the plano convex lens 111 constituting the lens sheet 11 is arranged so that the pixel-lens distance is gradually increased from the display surface 10a as it goes from the central position of the display surface 10a to the two end portions.

For example, the case where different images are viewed when the head portion is rotated by 20° each time in the one-side direction (leftwards) will be considered. Namely, the case where the head portion is rotated by five steps of 20°, 40°, 60°, and 80° or more will be considered.

FIG. 30 is a diagram illustrating a relation between the rotated head angle, the pixel range, and the pixel-lens distance in the stereoscopic image display apparatus 1 according to the embodiment. In the example illustrated in FIG. 30, for the convenience, for example, a half area (pixel 000~pixel 960) of the display surface 10a of the display device 10 having a resolution of 1920×1080 (pixels) in the right/left direction is illustrated. Herein, the central pixel of the display surface 10a in the right/left direction is denoted by "000", and the pixel at the end portion is denoted by "960". Namely, as the value of pixel is increased, the pixel is located toward the end portion of the display surface 10a in the right/left direction; and as the value of pixel is decreased, the pixel is located toward the central portion of the display surface 10a.

In addition, in the example illustrated in FIG. 30, in the horizontal direction of the display surface 10a, the display surface is divided into five areas according to the number of steps of rotated head angles (five steps), and different pixel-lens distances are set for the areas.

FIG. 30 illustrates the rotated head angle, the pixel range, and the pixel-lens distance. Herein, the rotated head angle is a rotation angle of the head portion of the viewer, the pixel range is a range (horizontal direction, right/left direction) of pixels of the display surface 10a which is mainly (centrally) included within a sight of view of the viewer at the rotated head angle. In addition, the pixel-lens distance is a distance between the pixel and the plano convex lens 111 of the lens sheet 11 facing the pixel.

In addition, FIG. 30 illustrates a configuration of the lens sheet 11 where the pixel-lens distance is 4.025 at the central position of the display surface 10a in the right/left direction and the pixel-lens distance is 4.026 at the end portion of the display surface 10a.

In the example illustrated in FIG. 30, for example, in the state where the viewer is positioned in front of the display surface 10a (rotated head angle=0°), the pixels 000 to 191 at the central portion of the display surface 10a are mainly recognized by the viewer. Similarly, for example, in the state where the viewer rotates the head portion by the rotated head angle of 40°, the pixels 384 to 566 of the display surface 10a are mainly recognized by the viewer. In addition, the plano convex lenses 111 of the lens sheet 11 facing the pixels 384 to 566 are separated by 4.02550 from the display surface 10a.

In addition, in the example illustrated in FIG. 30, the pixel-lens distances in each pixel ranges may be configured so as to be uniform, and the pixel-lens distances may be continuously changed between the pixel ranges. In addition, appropriate modifications are also available.

In addition, in the above-described example, the case where the distance between the pixel and the lens sheet 11 is set to 1.00 m is exemplified. However, for example, in the case where a large-sized display monitor is used as the display device 10, the front viewing position of the viewer is further separated from the display surface 10a. In this case, a degree of curvature of the edge portion of the lens sheet 11 is increased, so that the resolution of the display device 10 and the parallax information in the resolution and the rotation direction are increased, so that the pixel-lens distance also becomes fine.

The present invention is not limited to the above-described embodiment, but various changes and modifications are available within the scope of the present invention without deviating from the spirit of the present invention.

In the above-described embodiment, the example where the display device 10 is a liquid crystal display having a size of 27 inch or more is described. However, the present invention is not limited thereto, and a display having a smaller size may be used as the display device 10.

Figure 31:
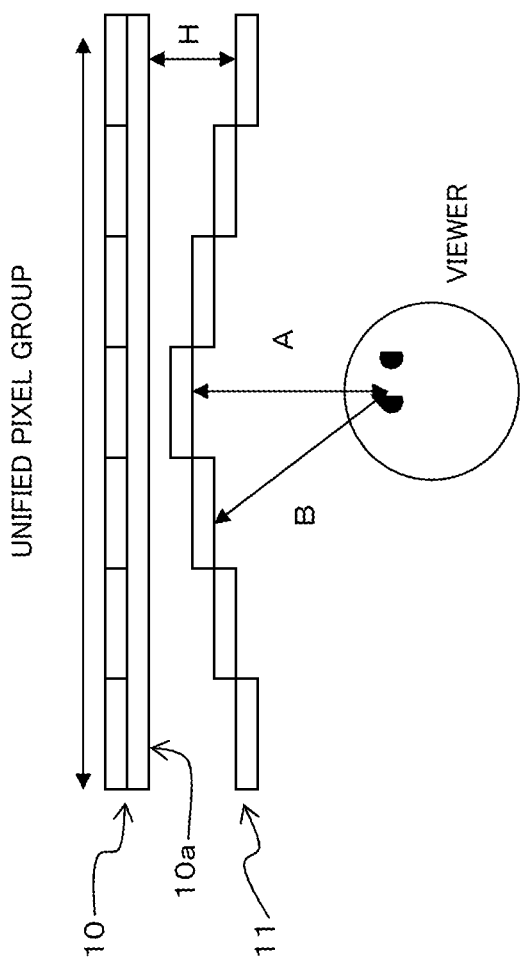
FIG. 31 is a schematic diagram illustrating a configuration of a stereoscopic image display apparatus according to a modified example of the embodiment.
Figure 32:
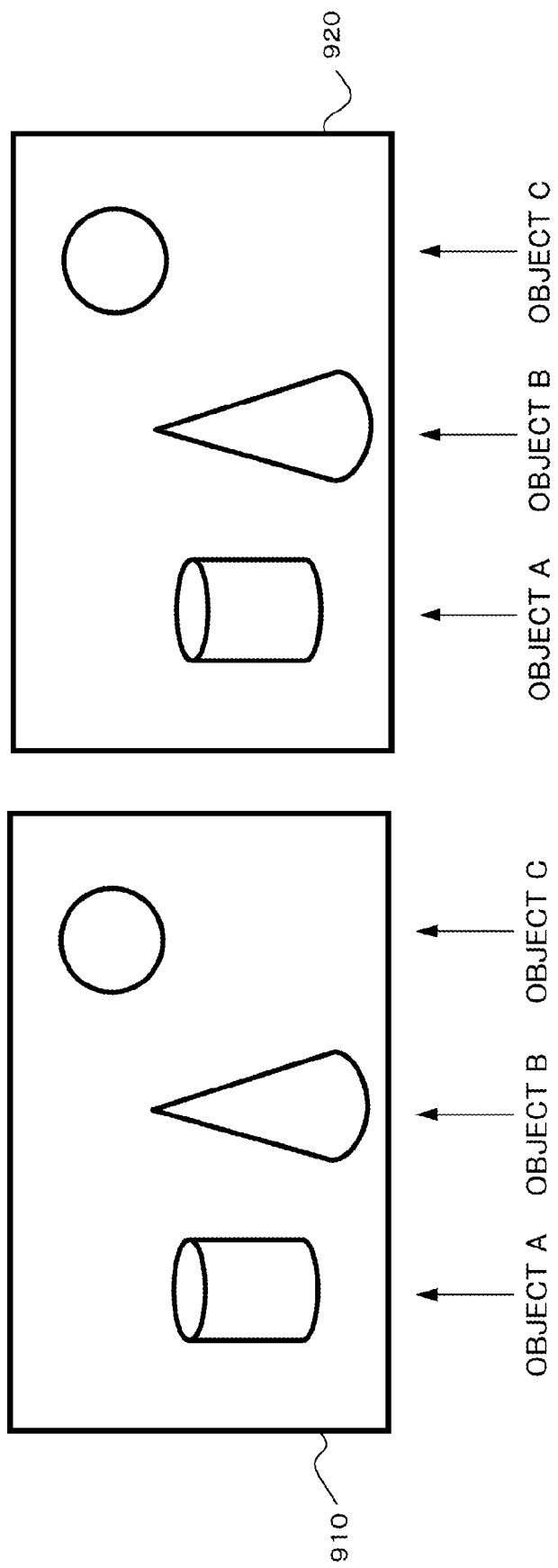
FIG. 32 is a diagram illustrating an example of a stereoscopic image.
Figure 33:
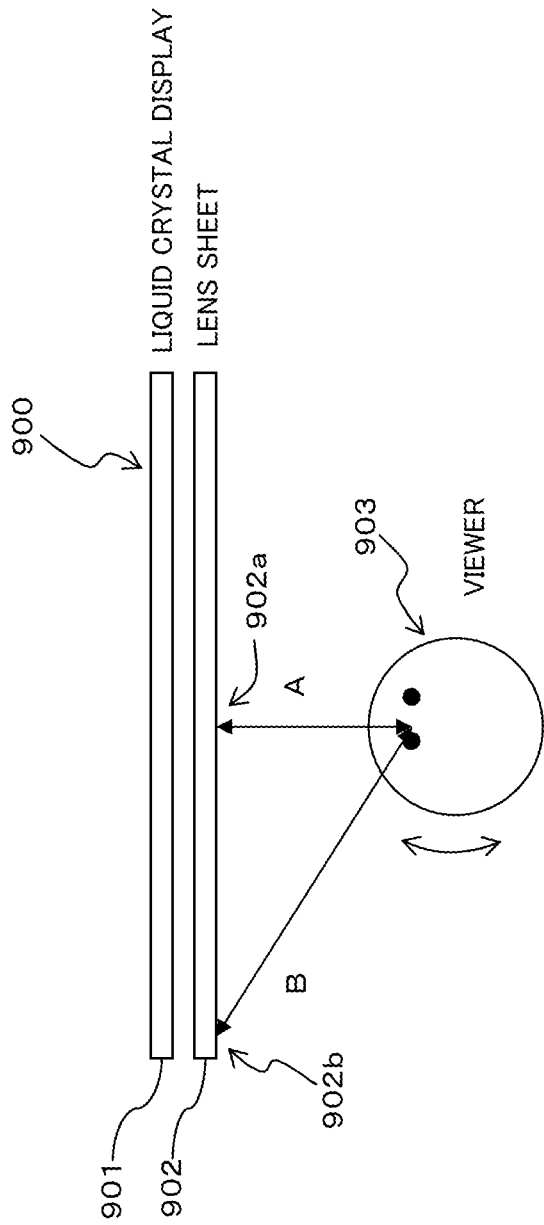
FIG. 33 is a schematic plan diagram illustrating a structure of a stereoscopic image generation apparatus using a lens sheet in the related art.
Figure 34:
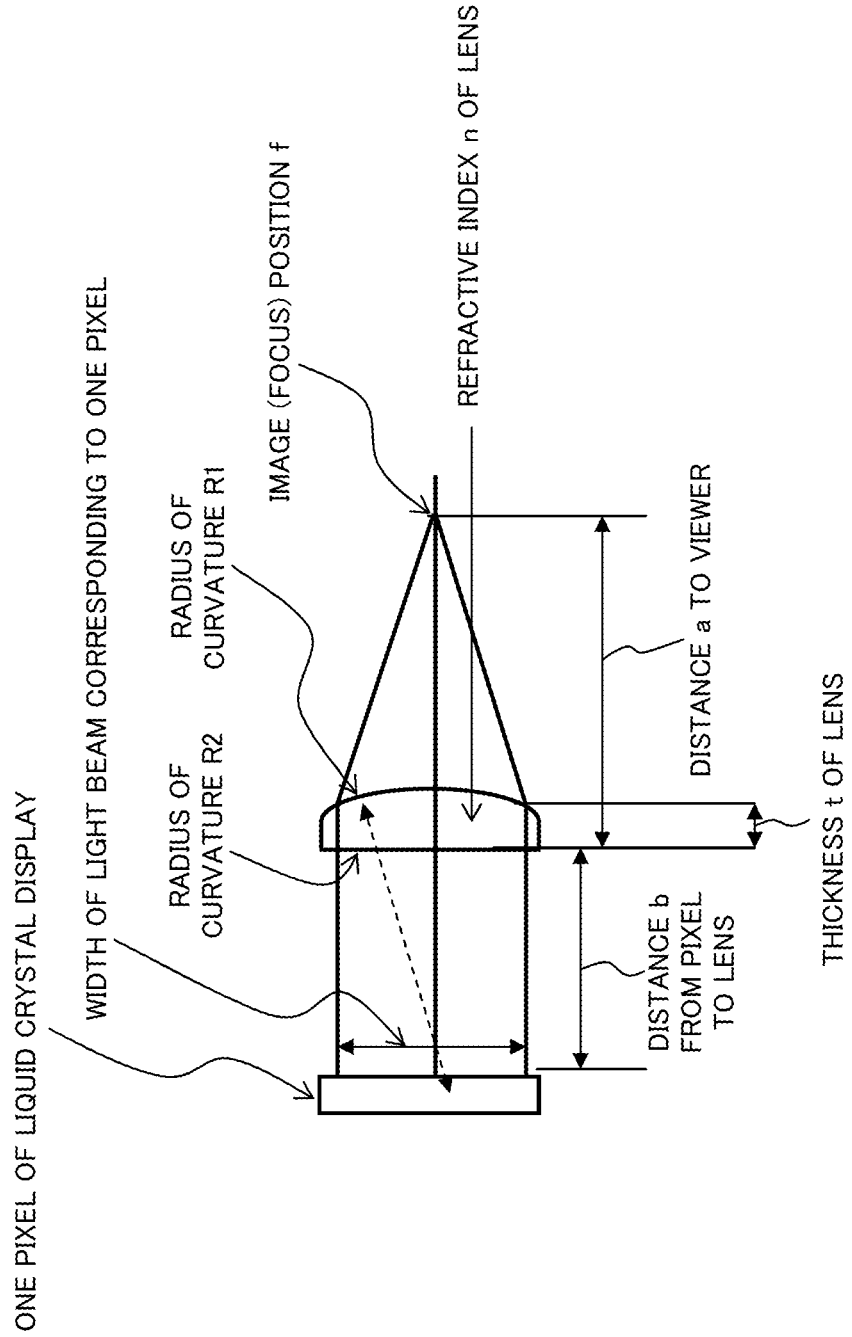
FIG. 34 is a diagram for describing an imaging distance of a lens sheet in the stereoscopic image display apparatus in the related art. The figure is a schematic diagram illustrating an example of a configuration of a logging information acquisition apparatus according to an embodiment of the present invention.

FIG. 31 is a schematic diagram illustrating a configuration of a stereoscopic image display apparatus 1 according to a modified example of the embodiment.

Hereinafter, the case where the stereoscopic image display apparatus 1 is a notebook PC including a liquid crystal display having a size of about 11.6 inch and a display device 10 is a relatively small-sized liquid crystal display having a size of about 11.6 inch will be described.

Since the liquid crystal display is a personal apparatus designed to be used by one person, the size of the liquid crystal display is included within a general viewing range of a person.

Therefore, like the above-described embodiment, if the viewer (manipulator) rotates the head portion about the neck as an axis, the line of sight is deviated from the liquid crystal panel.

Accordingly, in the modified example, the sensing unit 31 senses the movement amount of the pupil instead of sensing the rotation amount of the head portion based on the inter-eye distance of the viewer. Namely, the sensing unit 31 senses the movement amount of the pupil as sensing of the change in posture of the visual organ of the human body.

The sensing unit of sensing the movement amount of the pupil can be implemented through the capturing of the face image 300 of the viewer by the camera 12.

The range from the state where the viewer in front of the display surface 10a straightly views the central portion of the display surface 10a (rotation angle of 0°; Level 0) and to the state where the viewer views the end portion of the display surface 10a is divided into a predetermined number n (for example, n=10) of levels (for example, 0 to 9). The sensing unit 31 determines the level of the measured movement amount of the pupil.

The determination of the level by the sensing unit 31 can be performed by the process according to the above-described embodiment, so that the wraparound 3D display function using the stereoscopic display image can be implemented.

In the stereoscopic image display apparatus 1 according to the modified example, since the display surface 10a of the display device 10 has a small size, the area 10b other than the viewing range illustrated in FIG. 16 does not exist.

Therefore, in the modified example, the display controller 33 displays the stereoscopic display image by using the entire display surface 10a.

In the modified example, the sensing unit 31 senses a movement amount of the pupil. Therefore, unlike the above-described first embodiment, although the value of the focal length A from the display surface 10a to the right eye and the focal length B from the display surface 10a to the left eye are not changed, the difference is increased as it goes to the periphery of the display surface 10a. Therefore, the focal length on the right and left eyes can be changed by the lens sheet 11 having a curved structure, so that the viewer can accurately recognize the 3D image. Since the pixel array is the same as that of the first embodiment, the description thereof is not provided.

In addition, irrespective of the above-described embodiments, various changes and modifications are available within the scope of the present invention without deviation from the spirit of the present invention.

For example, in the above-described embodiment, the face image 300 is generated by using the camera 12 capturing the face image of the viewer, and the positions of the two eyes of the viewer are identified based on the face image 300. However, the present invention is not limited thereto, but the positions or the two eyes of the viewer or the like may be identified by using a sensor module other than the camera 12.

In addition, since the embodiments of the present invention are disclosed, the stereoscopic image display apparatus according to the present invention can be implemented and manufactured by the ordinarily skilled in the art.

The disclosed stereoscopic image display apparatus can focus a stereoscopic display image on the eyes of the viewer.

All examples and conditional language recited herein are intended for the pedagogical purposes of aiding the reader in understanding the invention and the concepts contributed by the inventor to further the art, and are not to be construed limitations to such specifically recited examples and conditions, nor does the organization of such examples in the specification relate to a showing of the superiority and inferiority of the invention. Although one or more embodiments of the present inventions have been described in detail, it should be understood that the various changes, substitutions, and alterations could be made hereto without departing from the spirit and scope of the invention.

What is claimed is:

1. A stereoscopic image display apparatus comprising:
    a lens sheet which is adjacent to a display surface of a display device having the display surface where plural types of display elements are repeatedly and consecutively arranged, and is configured by arranging a plurality of plano convex lenses, each of which is configured to include a convex portion protruding from the one surface and a flat plane as the other surface, along an arrangement direction where the display elements are repeated and consecutively arranged, consecutively side by side while varying a distance from the display surface;
    a storage unit which stores stereoscopic display images corresponding to parallax points with respect to a display object at a plurality of viewing points;
    a sensing unit which senses a posture changing amount of a visual organ of a human body;
    a selection unit which selects the stereoscopic display images for the respective viewing points from the storage unit according to the posture changing amount sensed by the sensing unit; and
    a display controller which allows the stereoscopic display images selected by the selection unit to be displayed on the display device.

2. The stereoscopic image display apparatus according to claim 1,
    wherein the display surface of the display device has a shape of a flat plane, and
    wherein the lens sheet has a shape which is curved along the arrangement direction, is closest to the display surface in the vicinity of a central portion of the arrangement direction, and is away from the display surface as it goes from the vicinity of the central portion to an end portion of the display surface.

3. The stereoscopic image display apparatus according to claim 1, wherein the storage unit stores left-eye and right-eye stereoscopic display images produced to have parallax therebetween in correspondence with left and right eyes as parallax points with respect to a plurality of viewing points in an outer circumference of the display object.

4. The stereoscopic image display apparatus according to claim 1, further comprising an image pickup unit,
    wherein the sensing unit senses the posture changing amount by recognizing positions of both eyes and an inter-eye distance based on an image of a face of a viewer captured by the image pickup unit.

* * * * *